(12) United States Patent
Bomo et al.

(10) Patent No.: US 6,608,132 B1
(45) Date of Patent: Aug. 19, 2003

(54) CARBON BLACK WITH ABRASION AND HYSTERESIS ADVANTAGES COMPARABLE TO N121 AND TEAR PROPERTIES COMPARABLE TO N115

(75) Inventors: Francis G. Bomo, Bristol (GB); Ronald A. Swor, Monroe, LA (US)

(73) Assignee: Columbian Chemicals Company, Marietta, GA (US)

( * ) Notice: Subject to any disclaimer, the term of this patent is extended or adjusted under 35 U.S.C. 154(b) by 1094 days.

(21) Appl. No.: 08/976,371

(22) Filed: Nov. 21, 1997

Related U.S. Application Data

(63) Continuation of application No. 08/697,734, filed on Aug. 29, 1996, now abandoned.
(60) Provisional application No. 60/017,583, filed on May 16, 1996.

(51) Int. Cl.$^7$ .................................................. C09C 1/48
(52) U.S. Cl. ...................................................... 524/496
(58) Field of Search ............................... 423/449.1, 475, 423/496; 524/495, 496

(56) References Cited

U.S. PATENT DOCUMENTS

| | | | | |
|---|---|---|---|---|
| 3,959,008 A | * | 5/1976 | Warner et al. | 423/450 |
| 4,927,607 A | | 5/1990 | Berg et al. | 423/457 |
| 4,929,280 A | * | 5/1990 | Wideman et al. | 423/449.1 |
| 5,159,009 A | * | 10/1992 | Wolff et al. | 423/449.1 |

OTHER PUBLICATIONS

Herd, C.R., et al., *Rubber Chemistry and Technology*, 66, 491–508 (1993). Oct.

Hess, W.M. and Chirico, V.E., *Rubber Chem. Technol.*, 50, 301–326 (1977), Jun..

Hess, W.M. and Klamp, W.W., *Rubber Chem. Technol.*, 56, 390 Jun. (1983).

Hess, W.M., Vegvari, P.C. and Swor, R.A., *Rubber Chem. Technol.*, 58, 350 (1985), Jun..

Kainradl, P, and Kaufmann, G., *Rubber Chem. Technol.*, 49, 823–859 (1976).

Lambillote, B. and Eiber, G.S., *Rubber World*, 209, (1), 27 (Oct. 1993).

Rivlin, R.S. and Thomas, A.G., *J. Polymer Sci.*, 10, 91 (1953), 292–318.

Rodgers, M.B. and Mezynski, S.M., *Kautschuk Gummi Kinst.*, 46, (9), 718 (1993).

* cited by examiner

*Primary Examiner*—Stuart L. Hendrickson
(74) *Attorney, Agent, or Firm*—Gregory C. Smith; Garvey, Smith, Nehrbass & Doody, L.L.C.

(57) ABSTRACT

The invention relates to an improved carbon black for tire tread rubber. More particularly, the invention relates to a carbon black which imparts upon tire tread rubber improved treadwear, lower rolling resistance, lower heat buildup and improved tear resistance. The improved carbon black is in the N100 series and, when in rubber, combines the long tread wear and low heat buildup advantages N121 carbon black with the high tear resistance properties of N115 or N110. The improved carbon black has particular application to truck and bus steel cord radial tire treads, especially for use in on/off highway conditions, and for high performance passenger car tires.

18 Claims, 23 Drawing Sheets

REINFORCEMENT PROPERTIES IN NR/BR TREAD

REINFORCEMENT PROPERTIES IN NR/BR TREAD

REINFORCEMENT PROPERTIES IN NR/BR TREAD

RELATIVE HYSTERESIS (TAN DELTA)–TREADWEAR–TEAR PROPERTIES OF CARBON BLACK A, N110/N115 AND N121 IN NR FORMULATION

CARBON BLACK WITH ABRASION AND HYSTERESIS ADVANTAGES COMPARABLE TO N121 AND TEAR PROPERTIES COMPARABLE TO N115

This is a continuation of application Ser. No. 08/697,734 filed on Aug. 29, 1996, now abandoned.

This application incorporates by reference, and claims priority of: U.S. Provisional Patent Application Serial No. 60/017,583, entitled A CARBON BLACK WITH ABRASION AND HYSTERESIS ADVANTAGES COMPARABLE TO N121 AND TEAR PROPERTIES COMPARABLE TO N115, filed May 16, 1996.

BACKGROUND OF THE INVENTION

1. Field of the Invention

The present invention relates to improved carbon black for tire tread rubber. More particularly, the present invention relates to carbon black which imparts upon tire tread rubber improved treadwear, lower rolling resistance, lower heat buildup and improved tear resistance. The improved carbon black is in the N100 series and, when in rubber, combines the improved treadwear and low heat buildup advantages of N121 carbon black with the high tear resistance properties of N115. The present invention has particular application to truck and bus steel cord radial tire treads, especially for use in on/off highway conditions, and for high performance passenger car tires.

2. General Background

As worldwide dependence on truck transportation and other truck tire usage steadily increases, new designs in radial truck tire technology will have an increasingly significant impact on the many economies of the world. In recent years, many radial truck tire performance improvements have been made. However, further advances to resist both premature failure and accelerated treadwear in severe services are still needed in tire design and in compounding materials development. The art has recognized that there is a long felt but unresolved need for improved failure resistance and other performance improvements for tread compounds including longer treadwear, improved tear resistance, lower heat build-up and lower rolling resistance. (See, e.g., M. B. Rodgers and S. M. Mezynski, Kautschuk Gummi Kunst., 46, (9), 718 (1993); and, B. Lambillote and G. S. Eiber, Rubber World, 209, (1), 27 (October 1993)).

Carbon black, a form of elemental carbon, is widely used as a component of tire rubber, for both natural and synthetic rubbers and blends of natural rubber with synthetic polymers. The physical characteristics of carbon black, such as particle size and structure, affect various performance properties of rubber compounds, such as tire treadwear, rolling resistance, heat buildup and tear resistance.

The present invention relates to a new carbon black (herein referred to as "carbon black A") designed to improve the qualities of tire tread rubber, including providing improved treadwear, lower rolling resistance, lower heat buildup and improved tear resistance. The improved carbon black is in the N100 series and, when in rubber, combines the long treadwear and low heat buildup advantages of N121 carbon black with the high tear resistance properties of N115. The carbon black of the present invention is particularly well suited for improving the qualities of tread for truck and bus steelcord radial tires (TBS/RT), and high performance passenger car tires. Medium or heavy-duty steelcord radial truck and bus tires (TBS/RT) encompass a number of market segments classified as over the highway truck and bus, construction/agricultural, mixed on/off road, city service and special fuel economy tires.

Currently, N100 and N200 series tread carbon blacks (as specified in ASTM D 1765) are used in TBS/RT and their retread compounds. These tread blacks are broadly characterized as having both high surface area and high structure levels.

The structure of a carbon black is the degree of particle aggregation, with a high structure carbon black having more particles aggregated into random structures than a low structure black. The structure of carbon black can be defined by the n-Dibutyl Phthalate Absorption number (DBPA). The larger the DBPA number, the higher the structure of the carbon black. Surface area can be measured by Iodine Adsorption number (Iodine No.). There is an inverse relationship between the iodine number surface area and particle size; the higher the number, the smaller the particle size.

The particle size and structure of carbon black affect various qualities of rubber containing carbon black, such as tire treadwear, tread rolling resistance, tread heat buildup and tread tear resistance. Accordingly, different carbon blacks are used in different treads depending on the specific service requirements of the tires.

For example, on-highway truck service exposes tires to high loads and high speeds over relatively smooth roads. For this application, in both Europe and North America, tread blacks such as N121, N110 and N234 are mainly used. Here, the performance concerns relate primarily to longer and more even treadwear.

However, rolling resistance is becoming a very important performance concern worldwide. In TBS/RT the tread plays the most important role in controlling rolling resistance.

The three aforementioned tread blacks (N121, N110 and N234), exhibit relatively high hysteresis characteristics (developing higher heat build-up temperatures and higher rolling resistance levels relative to coarser N200 and N300 series counterparts), with N110 being the most hysteretic followed by N121 and N234. Relative to each other, N121 develops the highest treadwear rating, followed by N234, and then N110. The applications for these tread blacks include new tread and retread compounds.

In on/off-highway truck service, the tires, when off the highway, generally experience rougher roads and sharper turns with high loads and at lower speeds than on-highway service. However, when they come back to the highway they experience the same high speeds and temperature conditions as on-highway tires.

For Europe and North America, the tread blacks commonly employed for this application include N110, N115 and N220. The performance concerns relate more to service life of the tread than to treadwear life. The greater the severity of tire service conditions the more important the resistance to failure becomes, particularly in the tread compound. These grades develop lower modulus levels and exhibit more resistance to tear than N121 or N234. N110 and N115 develop higher heat build-up temperatures and rolling resistance levels than N220 (or N121 and N234) and higher tear resistance levels.

While N115 and N110 are used in on/off highway treads in Europe, N115 is not used as much in this application in North America. These two tread blacks differ mainly in that N115 has higher tint, iodine number and nitrogen surface area levels than N110. Nevertheless, they perform similarly in rubber.

TBS/RT are often composed of carbon black reinforced polymer systems that are based mostly on natural rubber (NR) or blends of NR and synthetic polymers (emulsion styrene-butadiene copolymer, SBR, and polybutadiene, BR, rubber). (See, e.g., M. B. Rodgers and S. M. Mezynski, Kautschuk Gummi Kunst., 46, (9), 718 (1993), which is incorporated herein by reference)).

NR (natural rubber) is a natural product from latex-producing caoutchouc plants, of which the Hevea Brasiliensis is the most common, is a polyisoprene (methyl butadiene) elastomer.

BR (butadiene rubber) is a synthetic rubber produced from either an emulsion or solution polymerization of butadiene joined mostly linearly by 1,4 (preferred in cis-1,4 but, also in certain measure, trans-1,4 conformation) and by 1,2 additions.

SBR (styrene-butadiene rubber) is a synthetic rubber produced from either an emulsion or solution polymerization of butadiene and styrene in various ratios.

Among the rubbers suitable for use with the present invention are any natural rubbers, synthetic rubbers and blends of natural and synthetic rubbers. These include the so-called diene elastomers, i.e., for example oil-treated natural and synthetic rubbers, such as carboxyl rubbers, epoxy rubbers, transpolypentenamer, halogenated butyl rubbers, rubbers of 2-chlorobutadiene and polybutadiene rubbers. Typical of the synthetic rubbers are styrene-butadiene rubbers (SBR), whether clear or oil extended, emulsion SBR rubbers, high styrene SBR rubbers, solution SBR rubbers, starred solution SBR rubbers and functionalized solution SBR rubbers.

Further still, suitable rubbers are rubbers, plastics and mixtures thereof which can be crosslinked with sulfur and vulcanization accelerator(s) and also with peroxide to form elastomers. These include the so-called diene elastomers, i.e. for example oil-extended natural and synthetic rubbers, such as natural rubbers, terpolymers of ethylene, propylene and unconjugated dienes; copolymers of ethylene and propylene and also carboxyl rubbers, epoxy rubbers, transpolypentamer, halogenated butyl rubbers, rubbers of 2-chlorobutadiene, ethyl/vinyl acetate copolymers and, optionally, chemical derivatives of natural rubber and modified natural rubbers. Any suitable natural or synthetic vulcanizable rubber can be used for purposes of the invention.

Copolymers can be used by themselves or mixed with at least one other diene elastomer, in particular polyisoprene, natural rubber or polybutadiene. The elastomer used in the blend is preferably polybutadiene having more than 90% cis-1,4 bonds obtained by known methods of catalysis with the use of transition metal as described, for instance, in French Patent 1,436,706. This other diene elastomer can be present in variable proportions with respect to the copolymer prepared in solution, and preferably up to 70 parts by weight.

As conjugated diene, there are suitable, in particular, butadiene-1,3, isoprene, and 2,3-dimethyl-1,3-butadiene. As aromatic vinyl compound, there are suitable, in particular, styrene, ortho-, meta- and para-methylstyrene or the commercial "vinyl-toluene" mix.

The copolymer of conjugated diene and aromatic vinyl compound prepared in solution should have a total content of styrene of between 5 and 50% by weight and a glass transition temperature (Tg) of between 0 degrees and negative 80 degrees Celsius when measured by differential thermal analysis. The content of vinyl bonds in the thermal butadiene fraction incorporated can be between 20 and 80%, the content of trans-1,4 bonds can be between 20 and 80%, and the content of cis 1,4 bonds is complementary to the contents of vinyl bonds plus trans-1,4 bonds.

NR systems normally provide improved tear strength and building tack over synthetic polymer compositions and lower hysteresis due to the lower internal energy loss exhibited by NR on deformation. Further, the use of BR with NR can impart enhanced resistance to cut propagation and fatigue and improved abrasion resistance. SBR is used primarily in these blends to improve wet traction performance.

Under low severity operating conditions, NR provides the best treadwear resistance performance relative to NR/BR blends. With higher severity highway conditions, NR/BR blends provide the better treadwear resistance performance particularly with a high BR content. NR also has the lower hysteresis response for lower rolling resistance in truck tires.

The performance improvements needed for TBS/RT include improved treadwear and the reduction of tread compound hysteresis. The necessary emphasis is to reduce tread damage during service, particularly due to hysteresis, treadwear and tear performances. To satisfy these demands, tire components must develop high tear strength, high tensile strength and low heat build-up properties. For these reasons, the art has recognized a long felt but unresolved need for a more reinforcing and less hysteretic N100 series tread black for use in truck tire tread compounds. (See, e.g., M. B. Rodgers and S. M. Mezynski, Kautschuk Gummi Kunst., 46, (9), 718 (1993)).

The present invention satisfies this long felt but unmet need and provides a carbon black in the N100 series which imparts upon tire tread rubber improved treadwear, lower rolling resistance, lower heat buildup and improved tear resistance. The improved carbon black is in the N100 series and, when in rubber, combines the long treadwear and low heat buildup advantages of N121 carbon black with the high tear resistance properties of N115. The present invention particularly applies to truck and bus steel cord radial tire treads, especially for use in on/off highway conditions, and for high performance passenger car tires.

SUMMARY OF THE PRESENT INVENTION

The present invention relates to improved carbon black for tire tread rubber. More particularly, the present invention relates to carbon black which imparts upon tire tread rubber improved treadwear, lower rolling resistance, lower heat buildup and improved tear resistance. The present invention has particular application to truck and bus steel cord radial tire treads, especially for use in on/off highway conditions, and for high performance passenger car tires.

More particularly, the present invention relates to a carbon black in the N100 series, having a reduced structure, with a mean particle size of between about 16.0 and about 19.0 nm and a structure level, measured in DBPA of between about 100 to about 115 cc/100 g. More particularly, carbon black having a reduced structure, wherein the mean particle size is measured per ASTM D3849, procedure D and is between about 17.0 and about 18.0 nm. Still more particularly, a carbon black having a reduced structure, wherein the structure is measured by ASTM D2414 and is between about 105 and about 110 cc/100 g.

The present invention also relates to an improved carbon black having a modified aggregate shape distribution as determined by electron microscopy (See, e.g., C. R. Herd, et al., Rubber Chemistry and Technology 66, 491 (1993)) in conjunction with skeletonization of the aggregates via automated image analysis. Of the four shape categories defined for carbon black aggregates (1-Spheroidal, 2-Ellipsoidal, 3-Linear and 4-Branched), the present invention relates to an improved carbon black having a higher level of low structure ellipsoidal aggregates compared to conventional tread blacks N115 and N121. Further, it was found that the carbon black of the present invention has a lower number of volume-weighted aggregate branches about the mode of the volume-weighted distribution of branches. This narrower distribution about the mode is characterized by the DELTA B50, which is the full width at half maximum of the volume-weighted branch distribution.

The present invention further relates to an improved rubber composition containing an improved carbon black. More particularly, the present invention relates to an improved rubber composition containing an improved carbon black, wherein the carbon black imparts upon rubber composition improved treadwear, lower rolling resistance, lower heat buildup and improved tear resistance. The present improved rubber composition has particular application to truck and bus steel cord radial tire treads, especially for use in on/off highway conditions, and for high performance passenger car tires.

More particularly, the present invention relates to an improved rubber composition containing an improved carbon black in the N100 series, the improved composition having a treadwear rating for a natural rubber tread formulation on radial passenger cars of 107.2% relative to N110 at 100%, and tan delta hysteresis levels of 0.131 versus 0.137 and 0.145 for N100 and N115, respectively. The trouser tear resistance level of the improved composition is 82.6 kN/m compared to 81.3 and 49.3 kN/m for N115 and N121, respectively. More particularly, the improved rubber composition has abrasion and hysteresis properties of about 5%–10% higher and about 4 to 11% lower, respectively, and equivalent tear properties relative to N110 or N115. Still more particularly, the improved rubber composition has improved abrasion resistance (treadwear) and lower hysteresis properties of about 7% to about 10%, and about 5% to about 10%, respectively, as measured in relative treadwear ratings and tan delta level performances.

Further, the present invention relates to an improved rubber composition, having an improved carbon black with a reduced structure, in DBPA, of between about 105 to about 110 cc/100 g and improved tear resistance properties, comparable to N110 and N115, measured in kN/m, of between about 80 and about 85 kN/m.

The data herein describe a new tread black, carbon black A, that has been developed for application in truck/bus steelcord radial tire treads to address the specific needs for improved treadwear, lower rolling resistance, lower heat build-up and improved tear resistance. This tread black is classified as having an N100 fineness level, with a low surface microporosity level and a DBPA structure level comparable to N110 or N115.

In the experiments below, carbon black A was evaluated relative to conventional N100 and N200 series tread blacks in two separate truck tread formulations: NR and NR/BR (65/35). In the non-oil-extended NR formulation, carbon black A was compounded at a 50 phr loading level relative to N110, N115 and N121 at the same loading. In the oil-extended (25 phr) NR/BR formulation, carbon black A was compounded at a 60 phr loading level relative to N110, N115, N121 and N234. However, the tread blacks were preferentially located in the elastomer blends with more (49.5 phr) in the NR phase. This distribution was achieved through the preparation and subsequent blending of separate elastomer masterbatches.

In both tread formulations, carbon black A (relative to N110, N115 and N121) was shown to provide the desired specific performances of improved tear resistance, lower predicted rolling resistance, lower heat build-up and lower Mooney viscosity levels, while maintaining acceptable stress-strain and hardness property levels.

In treadwear testing in the NR tread formulation, carbon black A had better treadwear ratings than N110, with ratings equal to N121. For the NR/BR tread formulation, carbon black A exhibited better fatigue and better cut-growth resistances relative to N110, N115, N121 and N234. With respect to predicted relative wet traction performance, carbon black A was superior to N110, comparable to N115 and N234, and close to the performance level of N121 in the NR/BR formulation. The predicted dry traction was better than N121, similar to N234 and less than N110 and N115.

Although this invention relates to tread compounds containing NR or NR with BR, use of carbon black A in synthetic elastomers is expected to provide similar performance improvements. The unique performance of carbon black A with respect to N110, N115 and N121 suggests applicability to truck tire treads where more severe service demands are experienced as well as to off-the-road tire treads. Here, the good heat build-up, tear, fatigue and cut-growth properties will provide improved tire performances.

Other appropriate applications for carbon black A include high performance passenger tires, racing tires and truck tire retread compounds.

BRIEF DESCRIPTION OF THE DRAWINGS

For a further understanding of the nature and objects of the present invention, reference should be made to the following detailed description taken in conjunction with the accompanying drawings, in which like parts are given like reference numerals, and wherein.

DETAILED DESCRIPTION OF THE PREFERRED EMBODIMENT

I. Production of Carbon Black A

Figure 1:
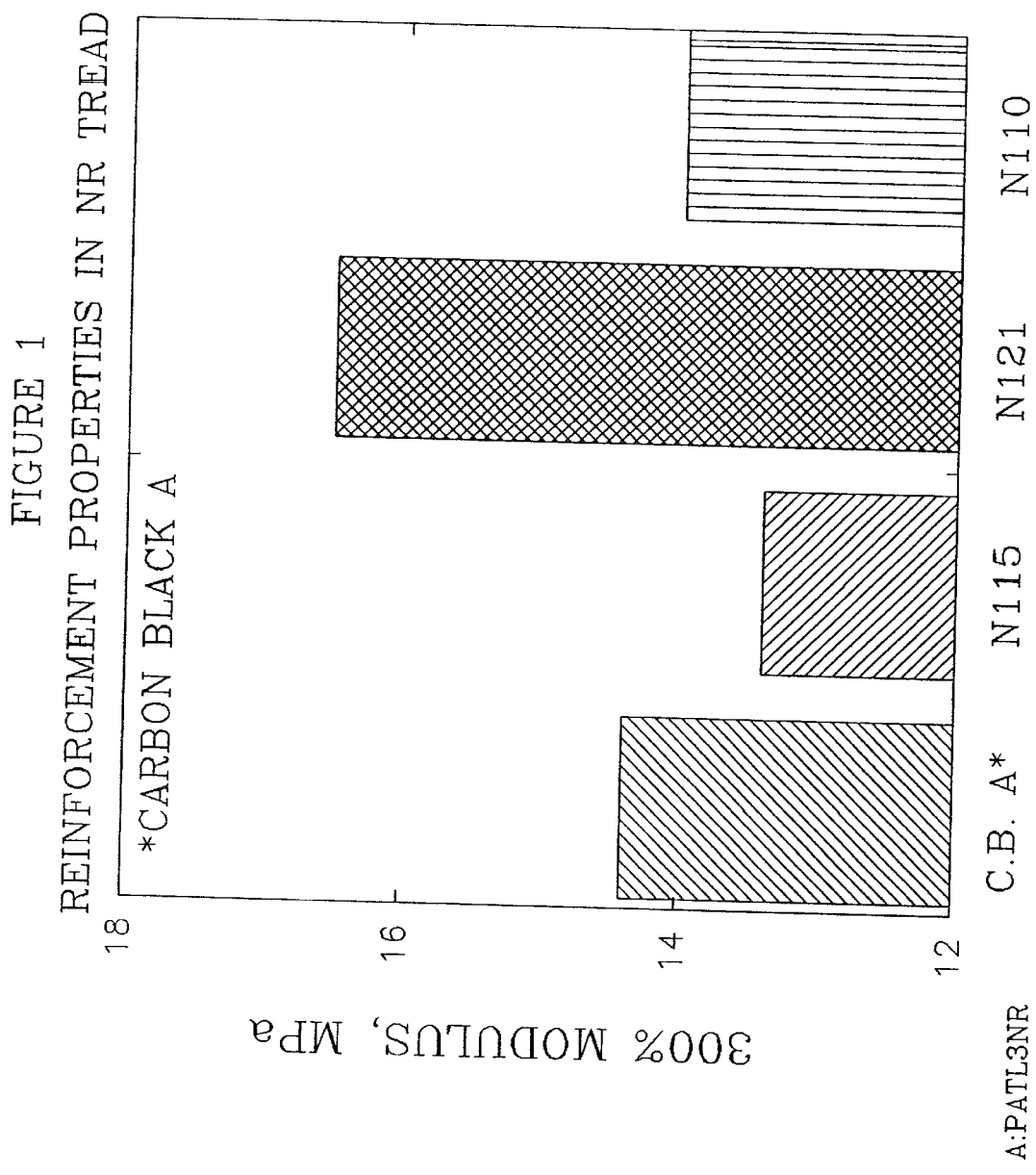
FIG. 1 shows 30% modulus properties in NR tread.
Figure 2:
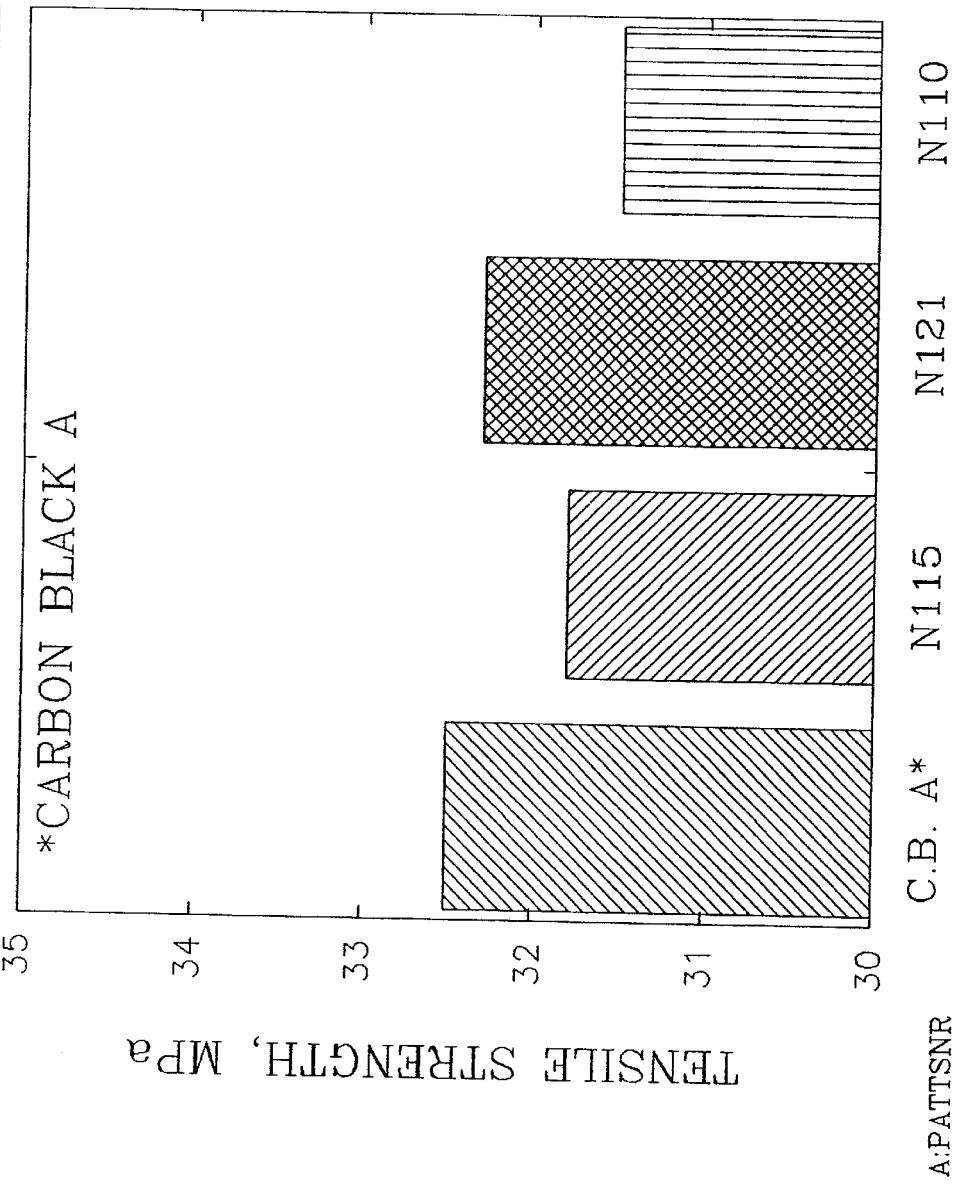
FIG. 2 shows tensile properties in NR tread.
Figure 3:
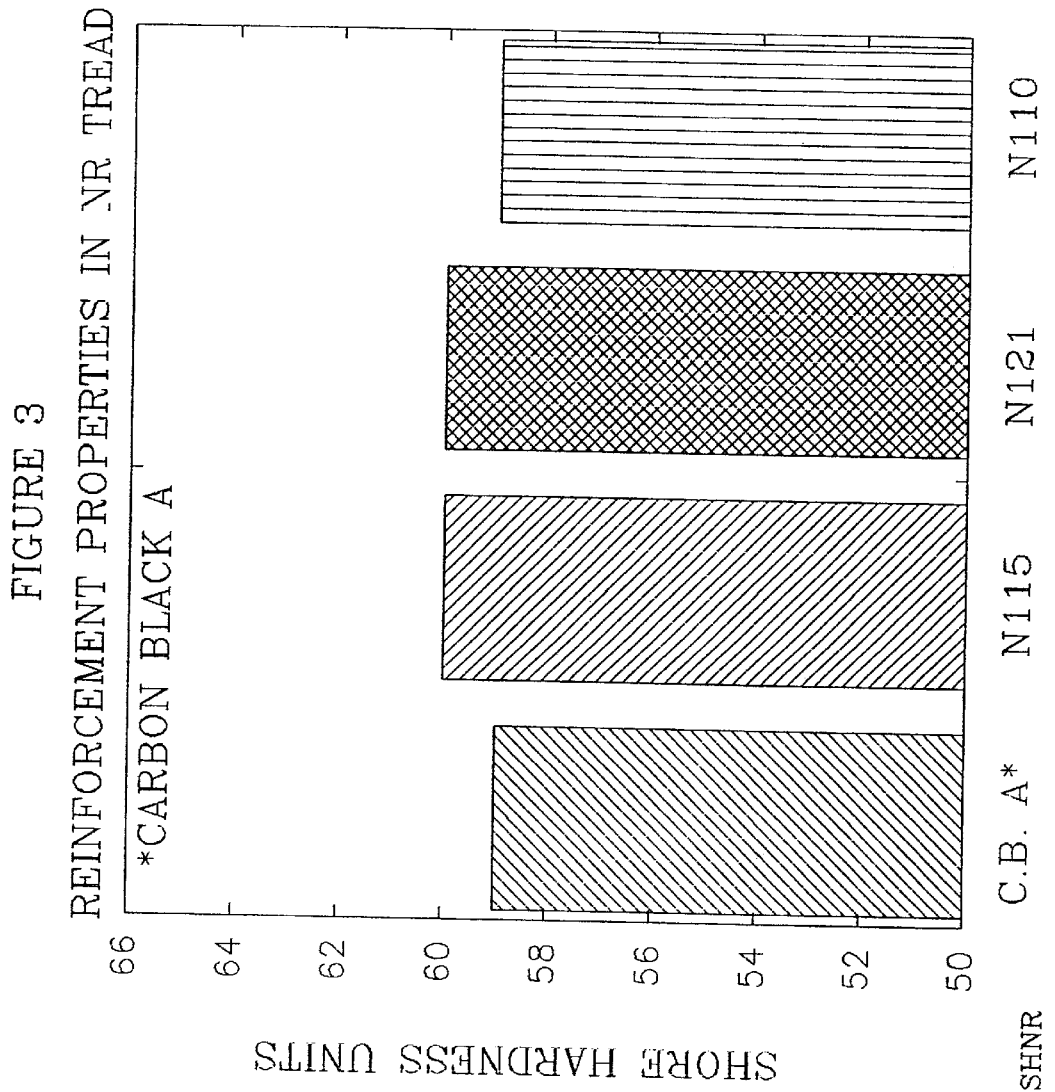
FIG. 3 shows Shore hardness properties in NR tread.
Figure 4:
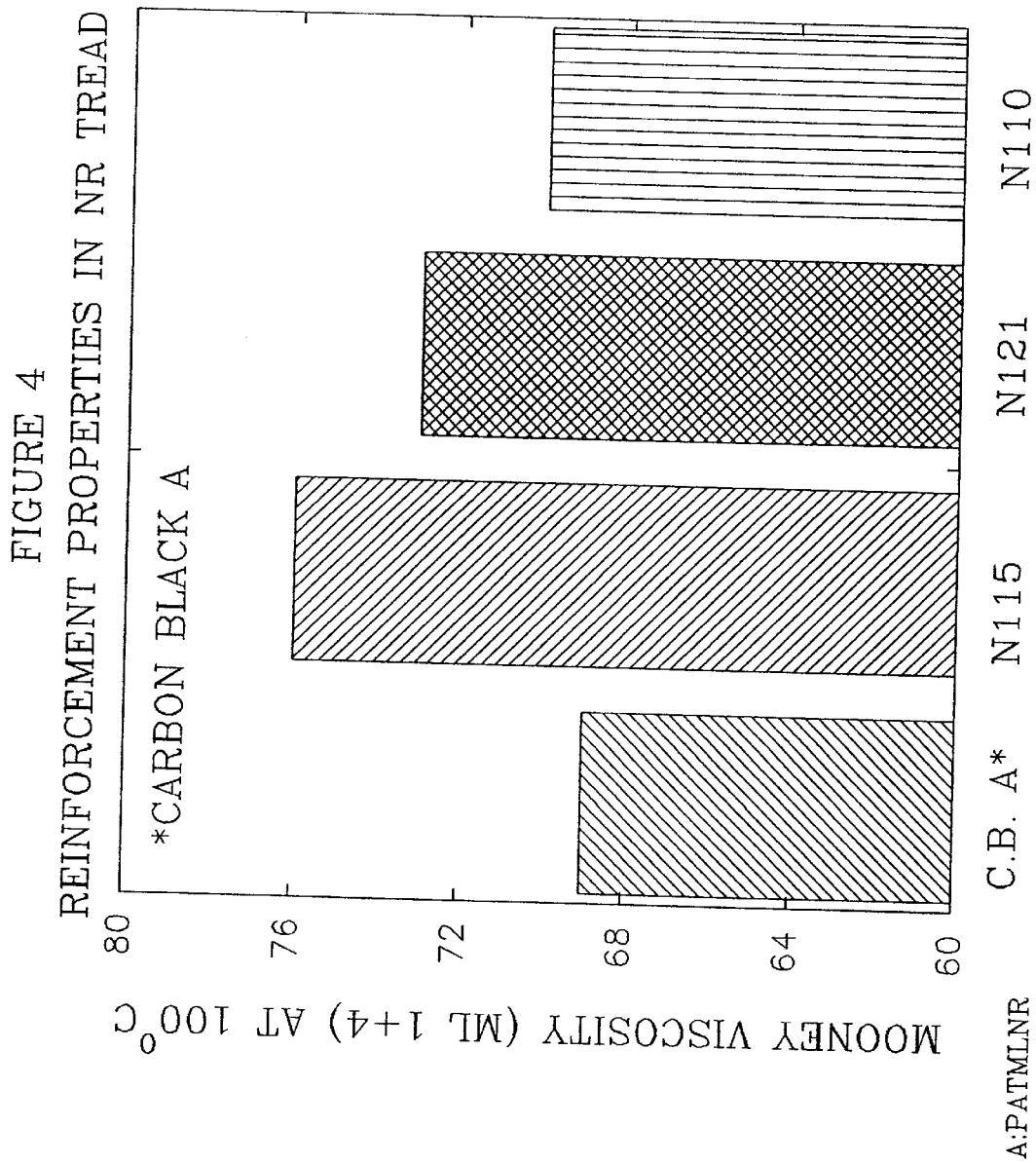
FIG. 4 shows Mooney viscosity properties in NR tread.
Figure 5:
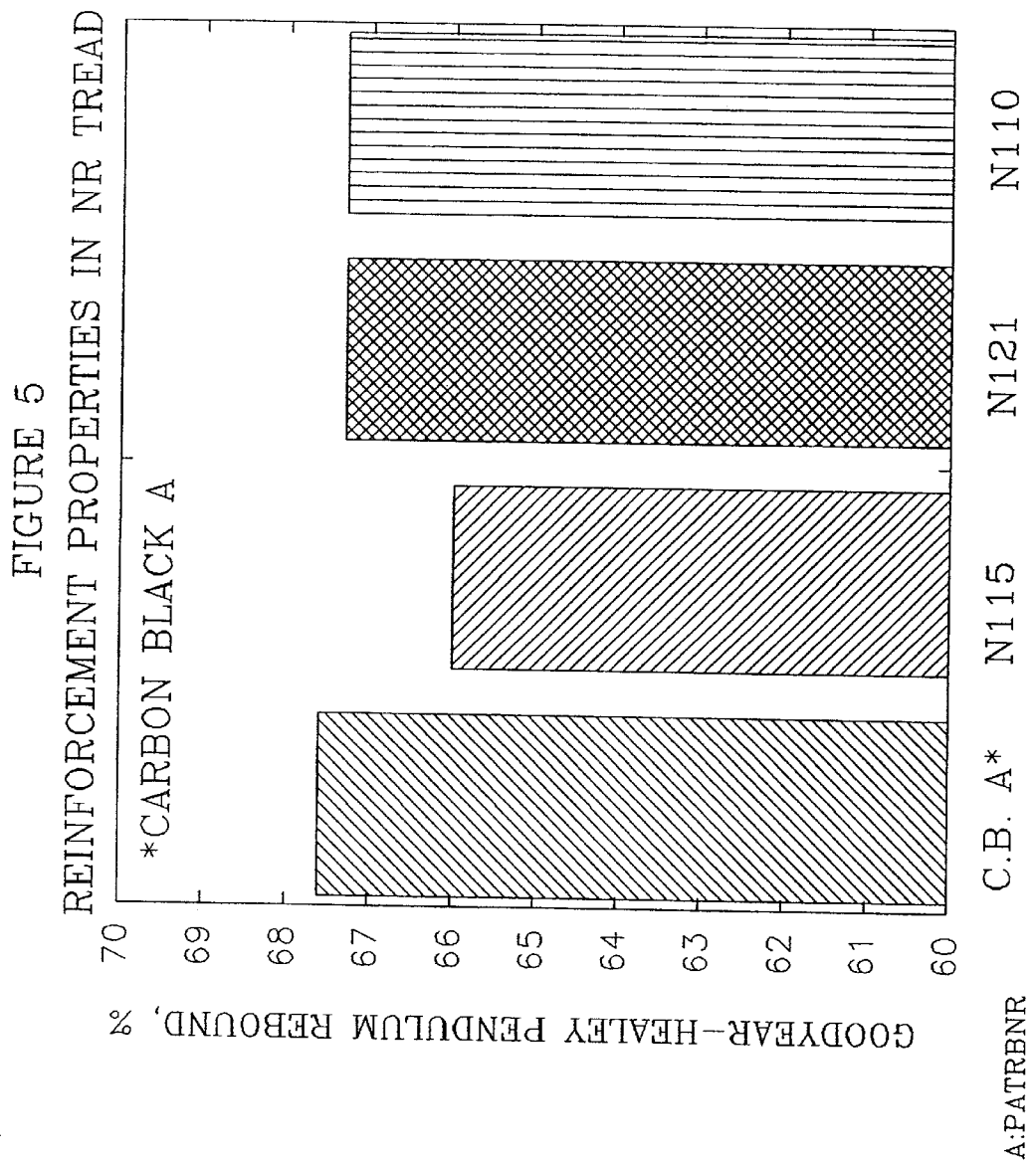
FIG. 5 shows pendulum rebound properties in NR tread.

To produce carbon black A, CATII reactors (U.S. Pat. No. 4,927,607) having an equivalent choke diameter of 8" were employed. The reactor was operated in accordance with U.S. Pat. No. 4,927,607 using air rates and cutoff spray positions familiar to those skilled in the art as outlined in Table 1.

TABLE 1

Furnace Operating Conditions for Production of C.B.A.*

| | |
|---|---|
| Air Rate | 290 mscfh[(1)] |
| Air Temperature | 1325° F. |
| Natural Gas Rate | 17.1 mscfh |
| Natural Gas Lower Heating Value | 954 Btu/scf |
| Oxygen Flow | 11.4 mscfh |
| Oil Flow | 5725 lb/hr |
| Oil Pressure | 160 psig |
| Oil Sprays | |
| Number | 4 |
| Position[(2)] | |
| #1 | −20 in. |
| #2 | −16 in. |
| #3 | −20 in. |
| #4 | −16 in. |
| Structure Control Additive | |
| Type | $K_2CO_3$ |
| Amount in oil | 48 ppm |
| Furnace Pressure | 5.9 psig |
| Quench | |
| Position[(2)] | 40 in. |
| Flow Rate | 10 gpm |
| Reactor Volume[(3)] | 5.9 ft.[(3)] |

*Carbon Black A
[(1)]mscfh = 1000 standard cubic feet per hour
[(2)]All positions are measured relative to the exit of the reactor choke. Downstream is positive.
[(3)]Reactor volume between choke exit and quench position.

A plant feedstock oil normally employed for the production of tread blacks was employed for the production of carbon black A.

The furnace setup for the carbon black A was similar to those used for an N100 series grade carbon black (see Furnace Operating Conditions). The concentration and the amount of potassium structure control chemical that was used for structure control was varied to satisfy the DBPA requirements for carbon black A. The concentration of potassium in the feedstock oil was 48 ppm.

II. Colloidal and Electron Microscopic Properties of Carbon Black A Compared to Conventional Tread Blacks The colloidal and electron microscopic (EM) morphological properties of carbon black A are given in Tables 2 and 3 relative to conventional tread blacks. The carbon black A can be classified as a moderately high structure N100 series tread black based on structure (DBPA and 24M4) and the various surface area levels. The EM particle morphology analysis confirms this N100 classification with respect to both mean diameter and surface area level.

TABLE 2

Carbon Black Colloidal Properties

| | carbon black A | N110 | N115 | N121 | N234 | N220 |
|---|---|---|---|---|---|---|
| Tint, % ITRB | 124 | 120 | 123 | 121 | 123 | 115 |
| DBPA, cm³/100 g | 107 | 113 | 111 | 132 | 125 | 115 |
| 24M4, cm³/100 g | 97 | 100 | 98 | 109 | 103 | 106 |
| Iodine No., g/kg | 120 | 145 | 152 | 120 | 121 | 122 |
| CTAB, m²/g | 126 | 128 | 128 | 118 | 121 | 109 |
| NSA, m²/g[a] | 125 | 131 | 147 | 123 | 122 | 118 |
| STSA, m²/g[b] | 122 | 117 | 126 | 118 | 113 | 109 |
| NSA-STSA, m²/g[c] | 3 | 14 | 21 | 5 | 9 | 9 |

[a]Multipoint measurement of total surface area (including micropore space).
[b]Statistical thickness surface area (external surface area).
[c]Indication of microporosity (surface porosity) level.

TABLE 3

ELECTRON MICROSCOPE (EM) MORPHOLOGICAL PROPERTIES (ASTM D 3849) PARTICLE ANALYSIS VIA CAB PAINT CHIP DISPERSIONS

| | C.B.A.* | N115 | N121 |
|---|---|---|---|
| MEAN DIAMETER, nm | 17.4 | 17.5 | 18.5 |
| WT. MEAN DIAMETER, nm | 26.8 | 28.1 | 28.8 |
| HETEROGENEITY INDEX | 1.54 | 1.56 | 1.56 |
| EM SURFACE AREA, m²/g | 141 | 136 | 124 |
| AGGREGATE SIZE ANALYSIS IN DRY STATE | | | |
| MEAN DIAMETER, nm | 71.3 | 63.0 | 84.2 |
| WT. MEAN DIAMETER, nm | 139 | 135 | 181 |
| HETEROGENEITY INDEX | 1.95 | 2.14 | 2.16 |
| V'/V INTRA-AGGREGATE ABSORPTION | 1.85 | 2.12 | 2.50 |
| SKELETONIZATION ANALYSIS IN DRY STATE | | | |
| AVERAGE AGGREGATE BRANCHES, WEIGHT % | 11.2 | 11.6 | 26.2 |
| DELTA B50* | 11.1 | 12.9 | 31.0 |
| WEIGHT PERCENT OF SHAPE TYPES | | | |
| 1-SPHEROIDAL | 0.8 | 0.6 | 0.4 |
| 2-ELLIPSOIDAL | 17.2 | 13.6 | 8.8 |
| 3-LINEAR | 41.8 | 48.8 | 28.7 |
| 4-BRANCHED | 40.2 | 37.0 | 62.1 |

*FULL WIDTH AT HALF MAXIMUM OF DISTRIBUTION OF AGGREGATE BRANCHES ON A WEIGHT PERCENTAGE BASIS
*Carbon Black A Pertaining to mean and weight mean particle diameters and particle size distributional characteristics, carbon black A is similar to conventional N100 series tread blacks. This size distribution measurement is represented in Table 3 by the heterogeneity index which is the weight mean diameter divided by the mean diameter (higher values indicate broader size distribution).

Carbon black A, N115 and N121 in Table 3 differ in mean and weight mean aggregate diameters and size distribution. These various aggregate properties fall between N115 and N121 for carbon black A. This average aggregate size would also be smaller than that observed for N234 or N220. Further, carbon black A has aggregates with lower occlusion capacity as shown by a lower V'/V. This is a measure of the ability of the aggregates to shield elastomer between aggregate branches which affects reinforcement and failure properties.

Skeletonization measurements indicate a slightly lower average number of aggregate branches (weight percent) than N115 and much lower than N121. Characterization of the shape types further indicate carbon black A to have higher percentage of low-occlusion capacity ellipsoidal aggregates. It is also relatively low in percentage of branched aggregates. In terms of Delta B50, carbon black A is slightly lower than N115 and both are much lower than N121.

III. Performance Advantages of Carbon Black A Relative to Conventional Grades of Carbon Black In Tread Compounds of TBS/RT To demonstrate the performance advantages of the carbon black A relative to conventional grades in the tread compounds of TBS/RT, two studies were conducted. The first study comprised a NR truck tire tread formulation (Table 4) with the carbon black A being compared to N121, N115 and N110 using conventional mixing-techniques. The tread black loading level was fixed at 50 phr. This tread formulation was not oil-extended.

TABLE 4

Study 1-Natural Rubber Tread Formulation

| Component | PHR |
|---|---|
| NR[a] | 100 |
| Carbon Black | 50 |
| Zinc Oxide | 4 |
| Stearic Acid | 1.5 |
| Microcrystalline Wax | 1 |
| Antidegradant[b] | 2 |
| Antioxidant[c] | 1 |
| Accelerator[d] | 1.6 |
| Sulfur | 1.2 |
| Total | 162.3 |

[a]SMR-CV60; [b]N-phenyl-N' (1,3-dimethylbutyl)-p-phenylenediamine; [c]Octylated diphenylamine; [d]N-t-butyl-2-benzothiazylsulfenamide The second study is based on a NR/BR (65/35) tread formulation (Table 5) where the polymer phase distribution of each tread black is controlled by the blending of separate black masterbatches of NR and BR as previously described. In this study the tread blacks (carbon black A, N110, N115, N121 and N234) were located with a higher loading in the NR phase, which produced the best balance of tear, fatigue, heat build-up and hysteresis properties in previous studies. The final tread black and oil loading levels were fixed at 60 and 25 phr, respectively.

TABLE 5

Study 2-NR/BR Tread Formulation

| Component | PRH |
|---|---|
| NR[a] | 65 |
| BR 1207 | 35 |
| Carbon Black | 60 |
| Aromatic Oil[b] | 25 |
| Zinc Oxide | 3.75 |
| Stearic Acid | 2.5 |
| Antidegradant[c] | 2 |
| Accelerator[d] | 1.2 |
| Sulfur | 2.5 |
| Total | 196.95 |

[a]SMR-CV60; [b]ASTM 102, [c]N-phenyl-N'(1,3-dimethylbutyl)-p-phenylenediamine, [d]2(morpholinothio) benzothiazole Compound Preparations All of the NR and NR/BR compounds in Studies 1 and 2 were prepared as masterbatches in a BR Banbury (Farrell) mixer using procedures previously described in W. M. Hess, P. C. Vegvari and R. A. Swor, Rubber Chem. Technol., 58, 350 (1985), which is incorporated herein by reference. In Study 2, the separate NR and BR masterbatches were cooled overnight before blending in the Banbury. The curatives were added on a two-roll mill after an overnight cooling of the masterbatches for Study 1 and immediately following the blending of the two masterbatches for Study 2. Dispersion indexes greater than 95 were achieved for all the compounds.

For Study 2, the NR masterbatch contained 76.2 phr of the tread black and the BR masterbatch 30 phr of the same tread black. Preparation of masterbatches restricts the movement of the tread blacks during blending which reduces interphase migration of the tread blacks. The two masterbatches were blended to achieve the 65/35 blend of NR/BR, along with the proper levels of stearic acid and antidegradant, prior to the addition of the curatives. The distribution of the tread black in the final elastomer blend was 49.5 phr (82.5%) in the NR and 10.5 phr (17.5%) in the BR.

Predictive Dynamic Property Testing

The dynamic property measurements needed to predict the relative rolling resistance and traction performances of the tread compounds in Studies 1 and 2 were determined using an Instron Model 1332 non-resonant dynamic tester as previously described in W. M. Hess and W. W. Klamp, Rubber Chem. Technol., 56, 390 (1983), which is incorporated herein by reference (Table 6).

TABLE 6

Dynamic Testing Conditions Predicting Tire Performance

| | Tire Rolling Resistance Prediction Conditions | Tire Traction Predition Conditions |
|---|---|---|
| Frequency, Hz | 10 | 1 |
| Temperature, ° C. | 50 | 0 |
| Strain Amplitude, DSA, % | 7.5 | 25 |
| Correlates with: | Tan Delta | Loss Compliance (D")-Dry Traction Loss Modulus (E")-Wet Traction |

The predicted rolling resistance is based on the Tan Delta measurement in compression at 50° C., interpreted relative to N220 and reported in the FIGS. (7 and 15) relative to N110. The predicted relative wet and dry traction responses are based on the loss modulus (E") and loss compliance (D") measurements, respectively, in compression at 0° C. and are reported in FIGS. 17 and 18 relative to N110.

Treadwear Testing

Treadwear testing was performed using only the NR tread compounds of Study 1. This testing was conducted at a Texas test track relative to an N110 control. Single tread compound recaps were placed on new radial passenger tire casings (P195-R75-14). The overall rate of wear was about 7600 km/mm (120 miles/mil), and the tires were evaluated for 14,500km (9,000 miles). Although not necessarily reflecting the actual ratings for truck tire usage, these treadwear measurements provide a relative performance ranking of these tread blacks.

Tear Testing

A modified trouser tear test was used to determine the tearing energy as defined by Rivlin and Thomas. R. S. Rivlin and A. G. Thomas, *J. Polymer Sci.*, 10, 91(1953). The specimen preparation and test procedures have been described by Hess and Chirico. W. M. Hess and V. E. Chirico, *Rubber Chem. Technol.*, 50.301 (1977). Eight specimens were tested for each sample at 100° C. and 8.5 mm/s.

Two types of tear resistance were measured: tear strength and knotty tear index. The tear strength is defined as the median load value divided by the specimen thickness. The knotty tear index is the difference between the median tearing load and the median load where tear propagation along the prescribed path ceases.

Fatigue/Cut Growth Testing

These tests were conducted using constant-strain cycles on a Monsanto Fatigue to Failure Tester. Fatigue testing was performed with eight dumbbell specimens per tread compound (having no central cut) at a 0–90% strain. Fatigue data are reported in kilocycles to failure of 63.2% of the specimens (Characteristic Fatigue Life) as determined by means of the Weibull distribution function. Cut growth testing used eight fatigue dumbbell specimens per tread compound, with each specimen having a central cut of 0.5 mm (0.2 inches). A cam providing a strain of 0–68% was used. The average kilocycles to failure of the eight specimens for each tread compound was used to judge performance.

Study 1-NR Tread

FIGS. 1–9 and Table 7 indicate the in-rubber and predicted tire performances of carbon black A relative to three conventional tread blacks in the NR tread. With respect to N110 and N115, carbon black A provides the expected levels of reinforcement (similar static and elastic moduli, tensile strength and hardness levels). Slightly higher rebound and lower predicted rolling resistance levels are also observed for carbon black A relative to N110 and N115, indicating an advantage in lower hysteresis properties for carbon black A.

TABLE 7

IN-RUBBER PROPERTIES IN NR THREAD FORMULATION

|  | C.B.A.* | N115 | N110 | N121 |
|---|---|---|---|---|
| STRESS-STRAIN PROPERTIES |  |  |  |  |
| 300% MODULUS, MPa | 14.4 | 13.4 | 14.0 | 16.5 |
| TENSILE, MPa | 32.5 | 31.8 | 31.5 | 32.3 |
| ELONGATION, % | 591 | 607 | 596 | 560 |
| Shore HARDNESS | 59 | 60 | 59 | 60 |
| MOONEY VISC., ML 1 + 4 @ 100° C. | 69.6 | 76 | 70 | 73 |
| HYSTERESIS PROPERTIES |  |  |  |  |
| Goodyear-HEALEY Rebound % | 67.6 | 66.0 | 67.3 | 67.3 |
| DYNAMIC PROPERTIES-ROLLING RESISTANCE CONDITIONS |  |  |  |  |
| E', MPa | 8.27 | 9.13 | 8.20 | 8.53 |
| E", MPa | 1.08 | 1.32 | 1.12 | 1.04 |
| PRED. ROL. RES., % | 82.7 | 85.8 | 84.0 | 80.8 |
| TAN DELTA | 0.131 | 0.145 | 0.137 | 0.122 |
| MODIFIED VEITH TROUSER TEAR |  |  |  |  |
| TEAR STRENGTH, KN/M | 82.6 | 81.3 |  | 49.3 |
| KNOTTY TEAR INDEX, KN/M | 27.5 | 26.0 |  | 23.6 |
| ABRASION PROPERTIES |  |  |  |  |
| TREADWEAR RATING, % N110 | 107.2 |  | 100 | 107.4 |

*Carbon Black A

It has been shown in the art that the heat generation of radial truck tire treads is primarily related to their loss modulus (E") properties. (See, e.g., P. Kainradl and G. Kaufmann, Rubber Chem. Technol., 49, 823 (1976), which is incorporated herein by reference). On this basis, carbon black A has predicted heat build-up properties similar to N110 and N121 and slightly lower than N115 (FIG. 6) in this formulation. These reinforcement and hysteresis responses are consistent with the structure-fineness-porosity relationships of the carbon black A discussed earlier.

The elongation levels for these tread blacks range from 560–607%, with the carbon black A performing equal to N110 at 591%. Rheometer cure rates (T90) at 165° C. are equivalent for these four tread blacks.

In terms of Mooney viscosity properties, the carbon black A develops the lowest level (69.6 units) observed in this formulation. This lower response implies that the tread compound processability characteristics will not be adversely affected by substitution of this new tread black for one of the conventional grades.

Relative to N121, carbon black A shows lower moduli (static and elastic), comparable tensile and slightly higher hysteresis levels as predicted. The hardness level is also slightly lower. Two other relevant in-rubber performance improvements observed for carbon black A are tear and treadwear resistance properties. For the former property, a comparison to N115 and N121 in the NR tread formulation is made.

Figure 23:
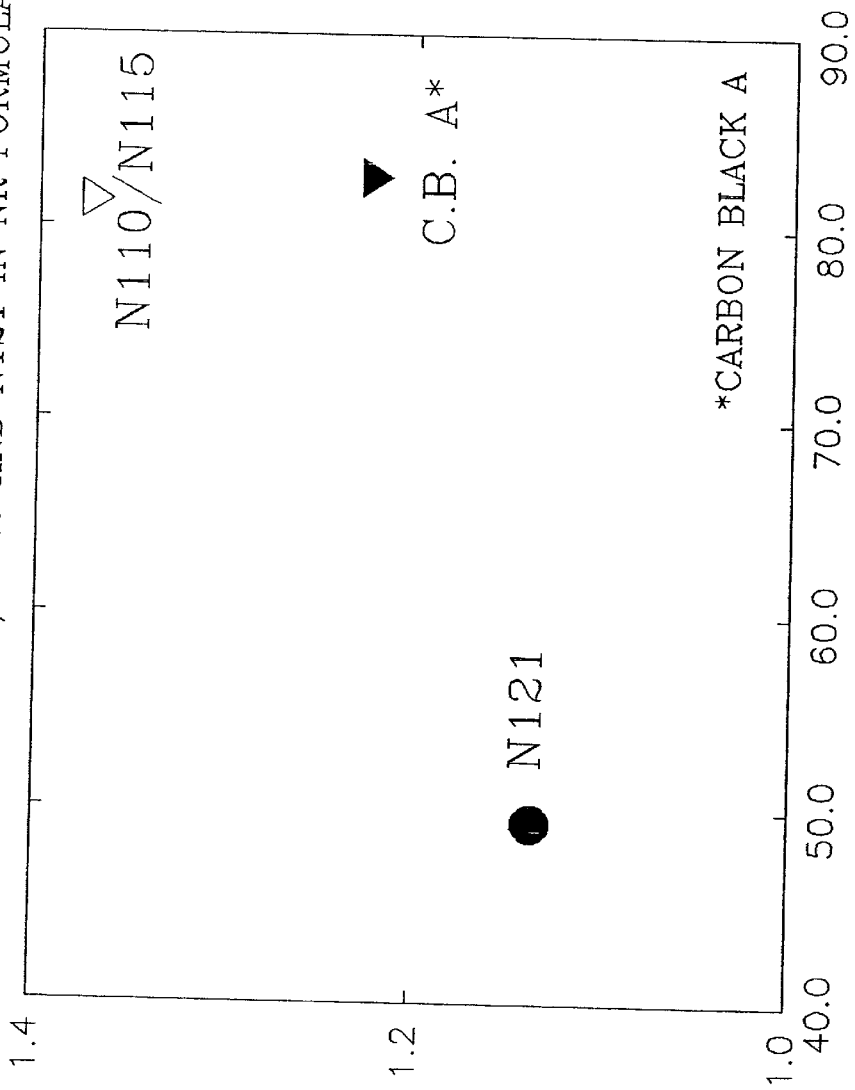
FIG. 23 shows a schematic comparison of the relative hysteresis properties, abrasion resistance properties and tear resistance properties of N115/N110, N121 and carbon black A.

FIG. 23, prepared using the data from Table 7, shows a schematic comparison of the relative hysteresis properties, abrasion resistance properties and tear resistance properties of N115/N110, N121 and carbon black A.

Figure 8:
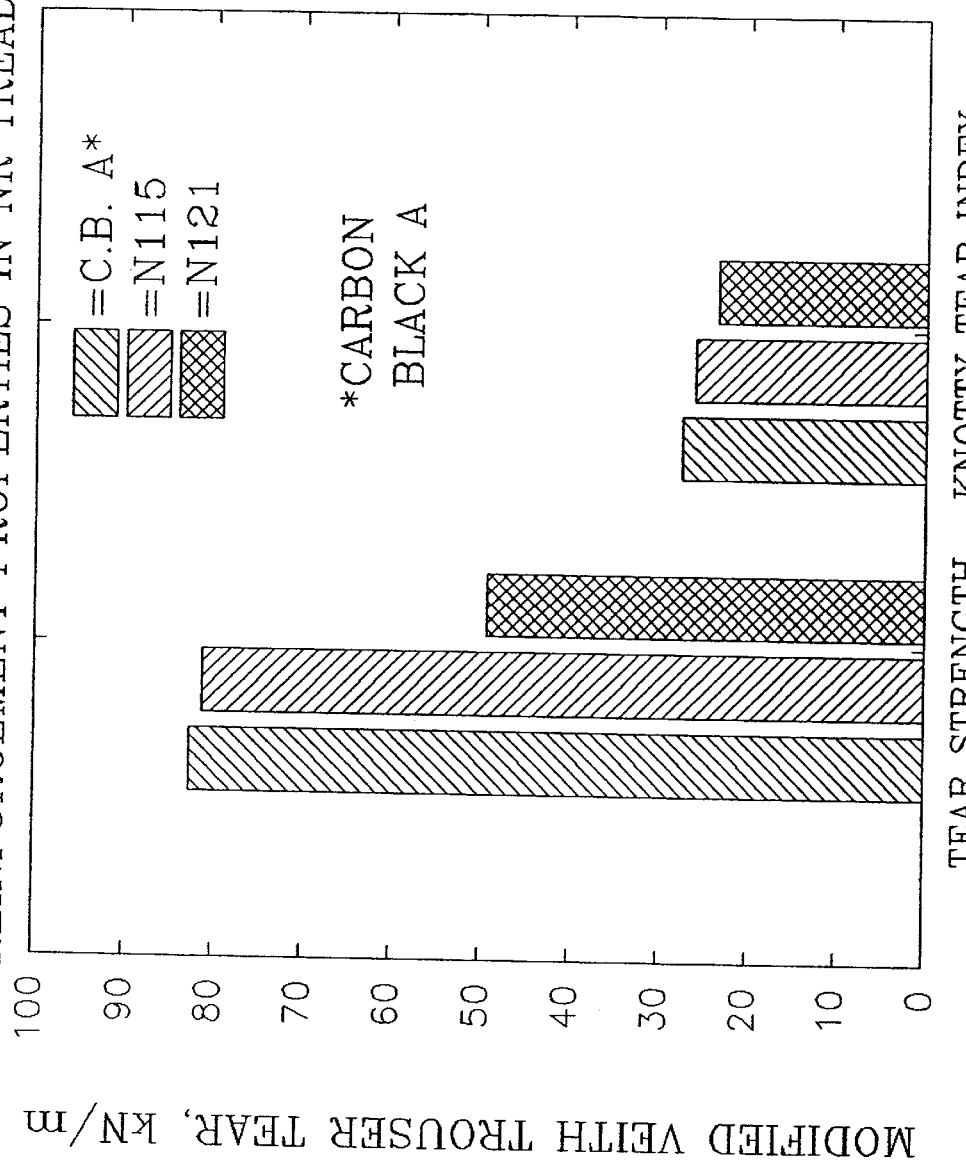
FIG. 8 shows modified Veith trouser tear properties in NR tread.

In FIG. 8, the tear strength of carbon black A is equivalent to N115 and significantly greater than N121. With respect to knotty tear index, a similar, but less dramatic, performance pattern is observed.

Figure 9:
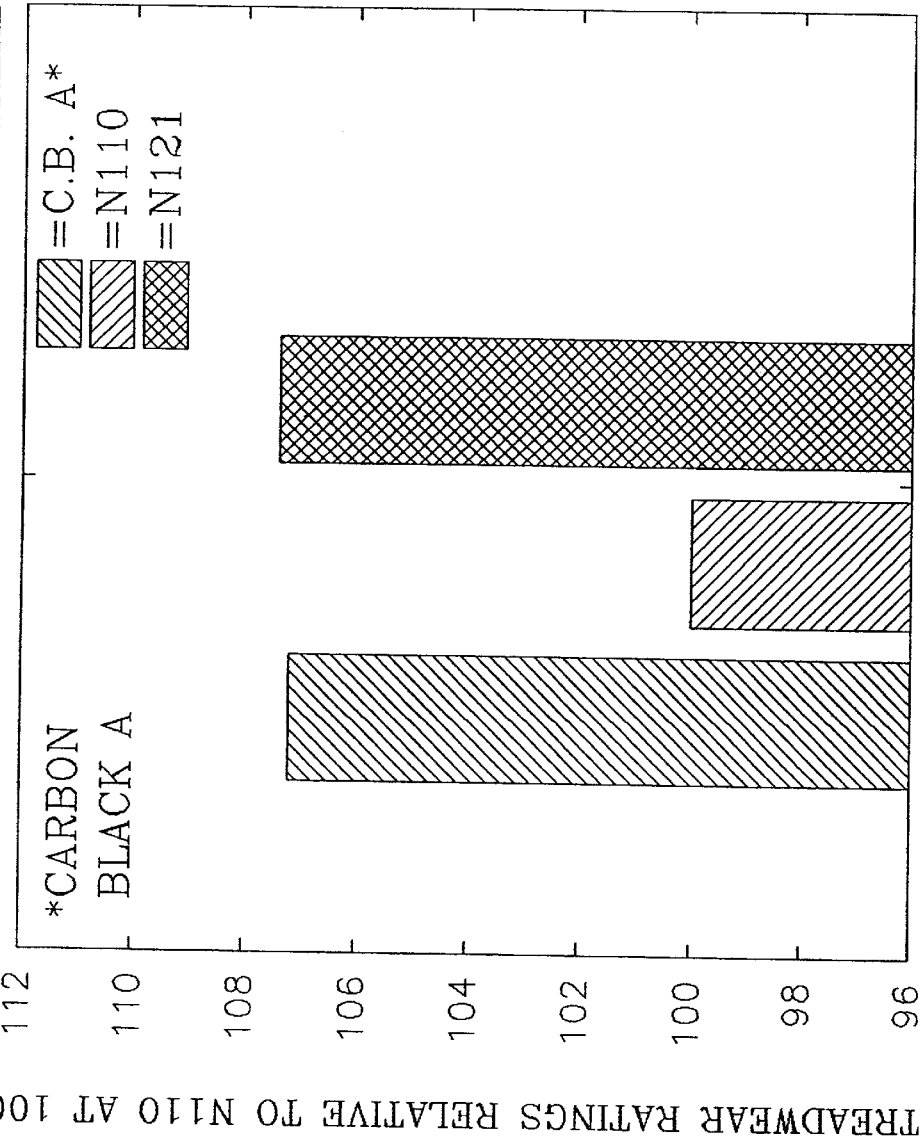
FIG. 9 shows treadwear resistance properties in NR tread.
Figure 10:
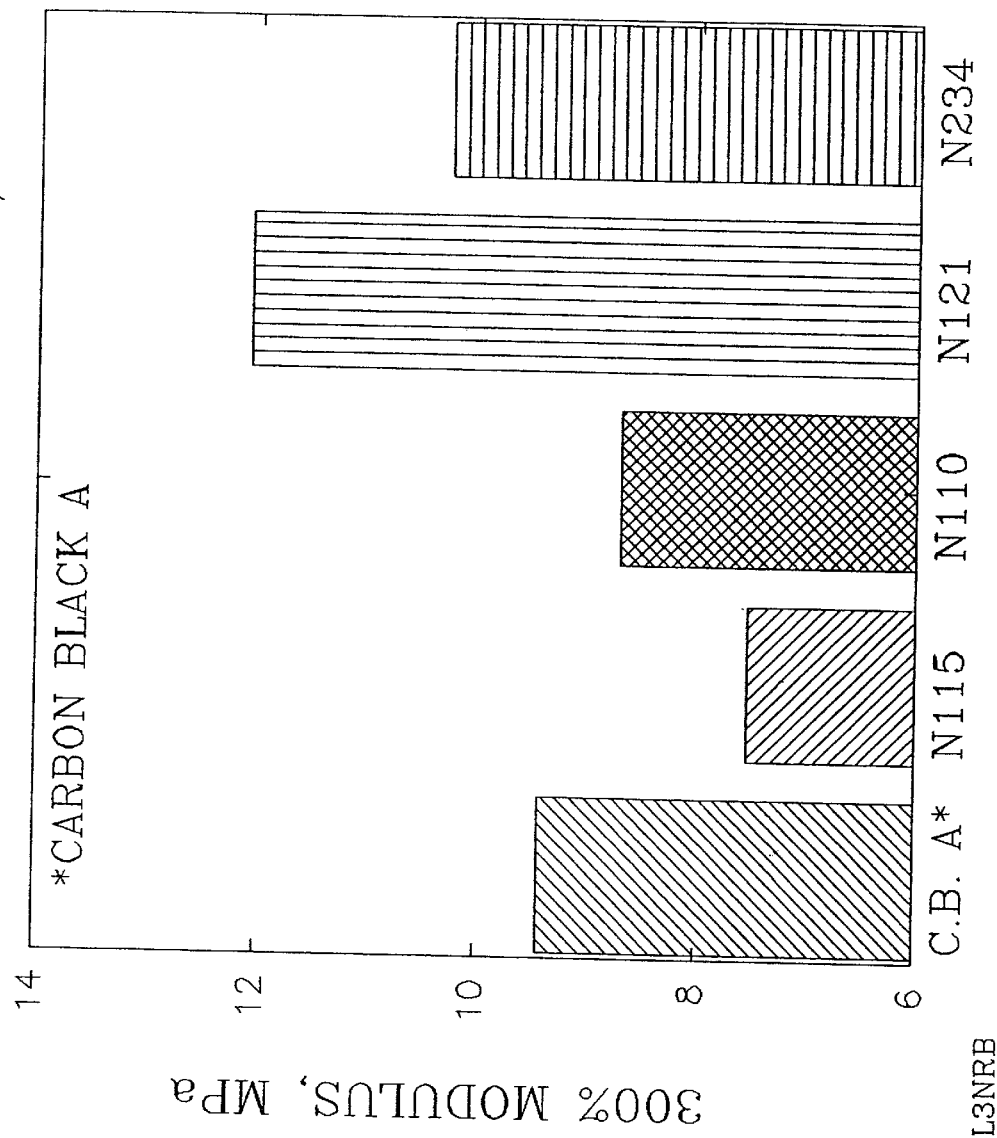
FIG. 10 shows 300% modulus properties in NR/BR tread.
Figure 11:
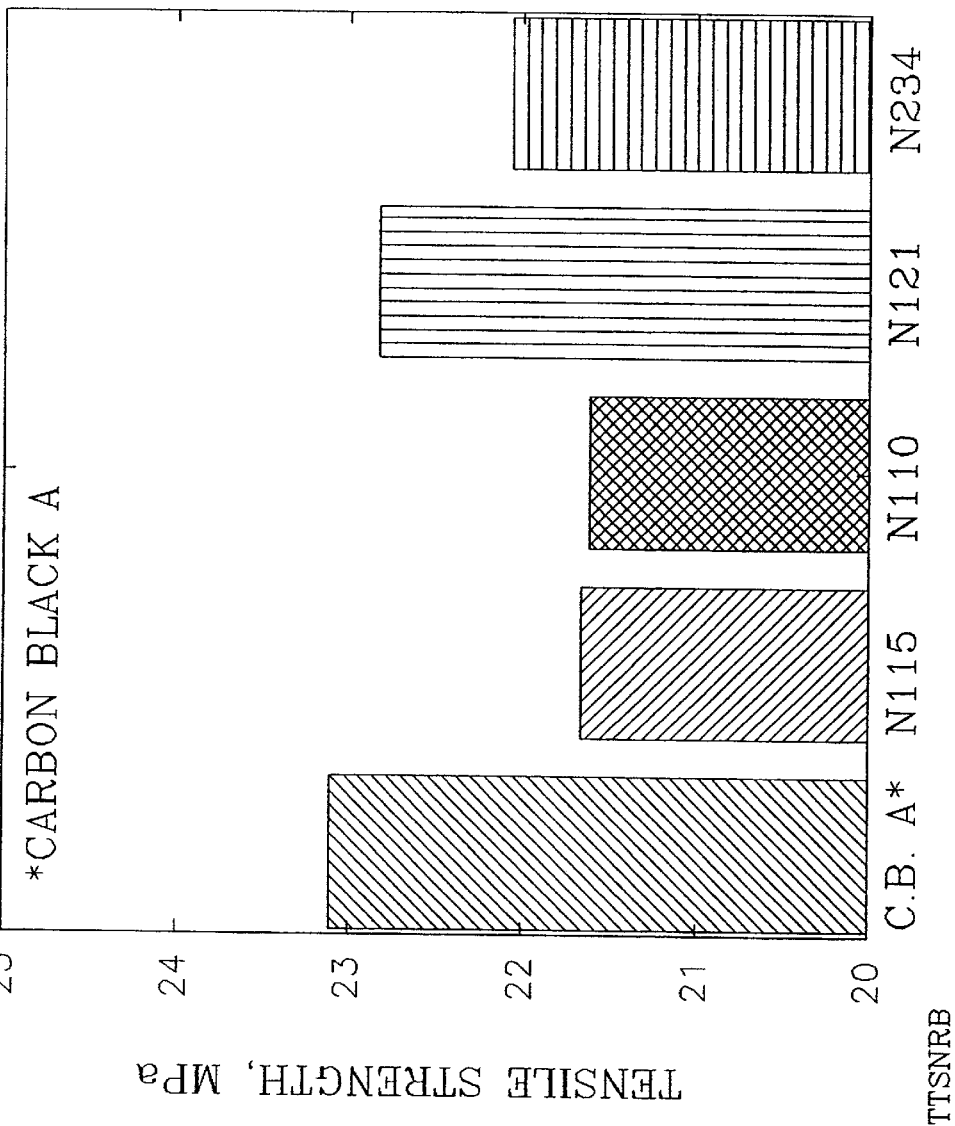
FIG. 11 shows tensile properties in NR/BR tread.
Figure 12:
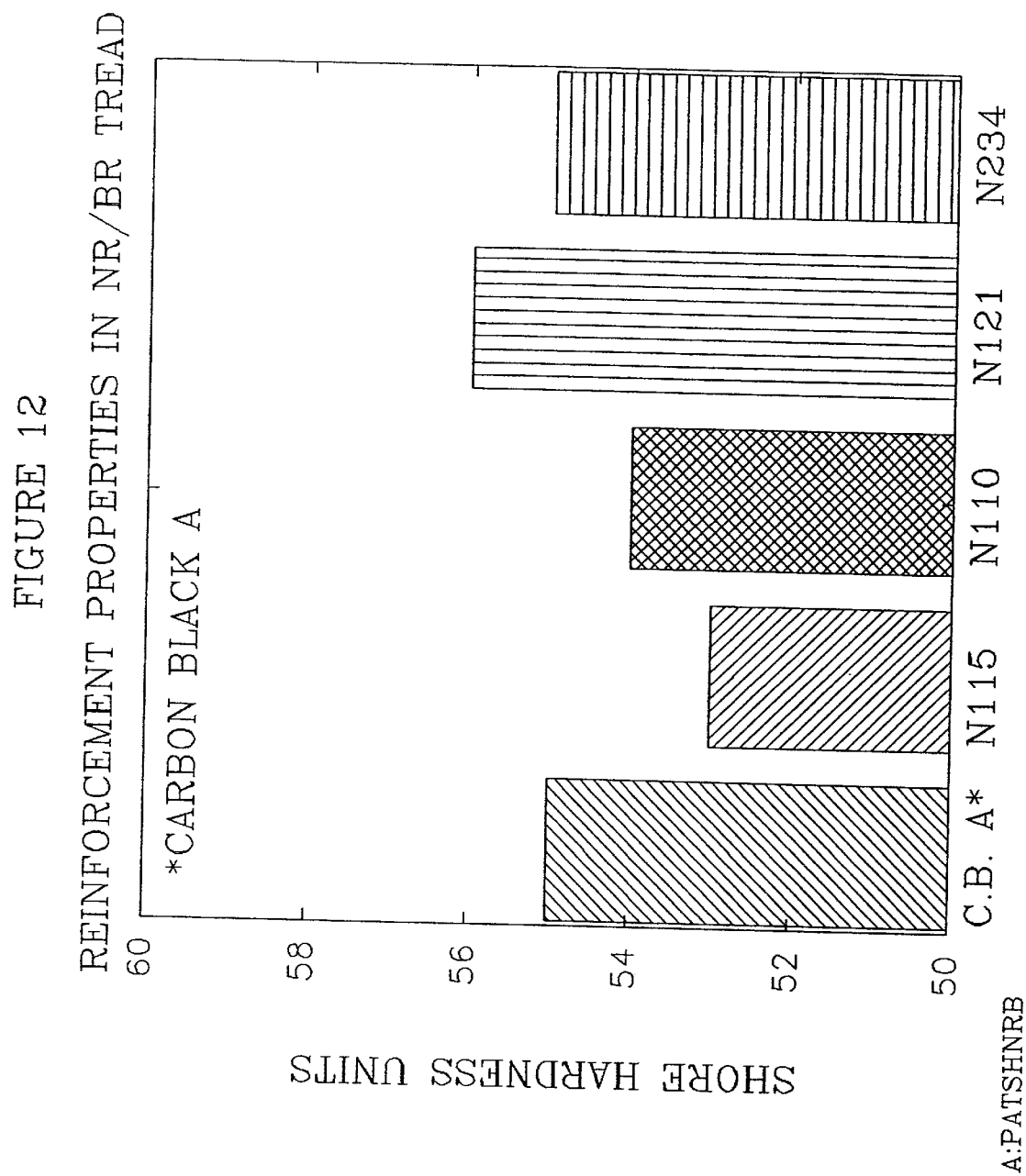
FIG. 12 shows shore hardness properties in NR/BR tread.
Figure 13:
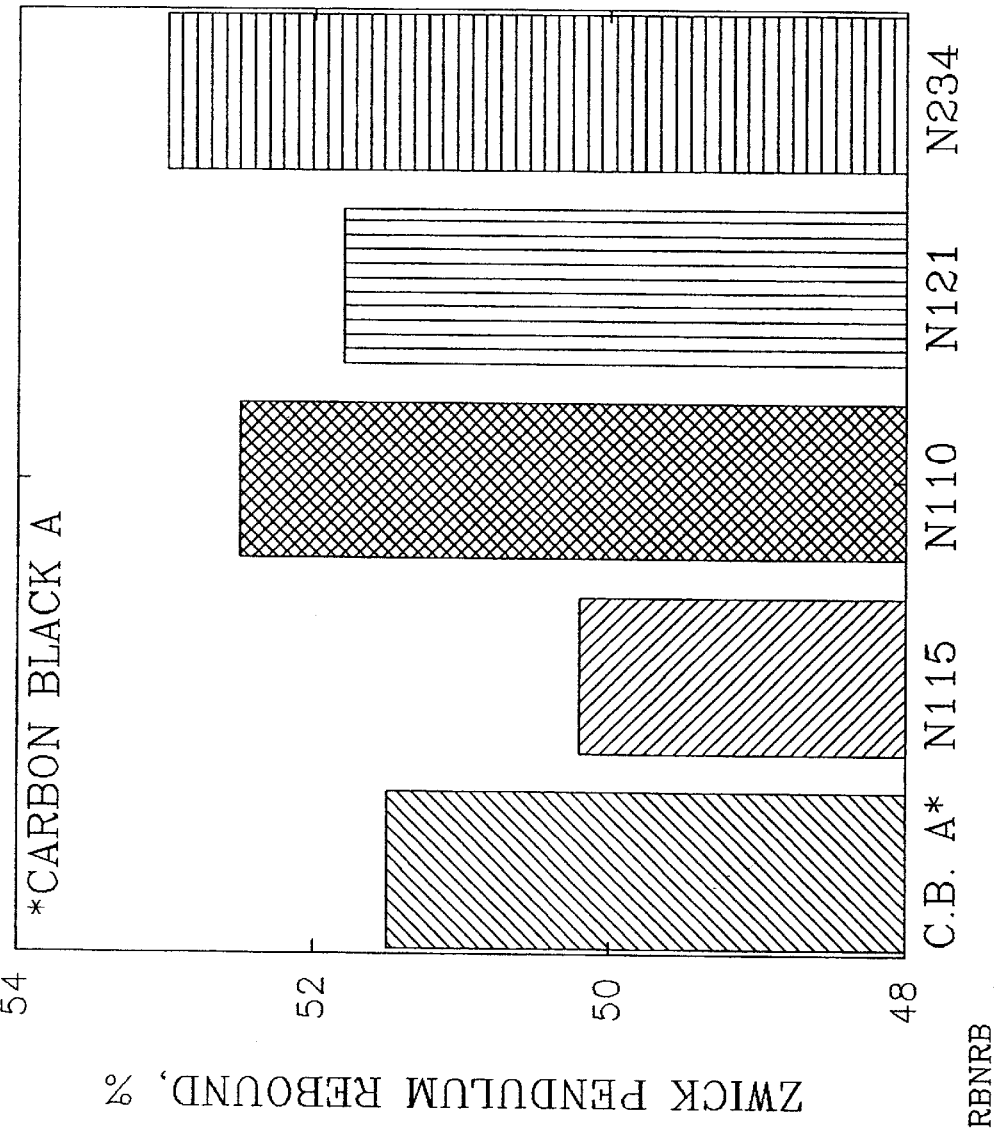
FIG. 13 shows pendulum rebound properties in NR/BR tread.

In reference to the treadwear resistance properties, a comparison of carbon black A is made to N110 and N121 in FIG. 9. Carbon black A shows a performance equivalent to N121 and significantly higher than N110 in treadwear resistance.

From the above discussion, it is apparent that the performance advantages for carbon black A over conventional tread blacks used for TBS/RT have been demonstrated. These performance improvements are better tear, treadwear, heat build-up and rolling resistances.

Study 2-NR/BR Tread

FIGS. 10–22 and Table 8 identify the in-rubber and predicted tire performances of carbon black A relative to N110, N115, N121 and N234 in the NR/BR tread. For the reinforcement and rebound properties given in FIGS. 10–13, the observed performance advantages of carbon black A are consistent with the trends reported for Study 1 in the NR formulation. As expected, carbon black A develops slightly lower modulus and equal hardness levels, and slightly higher tensile and lower rebound levels relative to N234.

TABLE 8

IN-RUBBER PROPERTIES IN NR/BR THREAD FORMULATION

| | C.B.A.* | N115 | N110 | N121 | N234 |
|---|---|---|---|---|---|
| STRESS-STRAIN PROPERTIES | | | | | |
| 300% MODULUS, MPa | 9.43 | 7.53 | 8.69 | 12.07 | 10.26 |
| TENSILE, MPa | 23.11 | 21.66 | 21.61 | 22.83 | 22.06 |
| ELONGATION, % | 593 | 616 | 634 | 519 | 556 |
| Shore HARDNESS | 55 | 53 | 54 | 56 | 55 |
| HYSTERESIS PROPERTIES | | | | | |
| ZWICK Rebound % | 53.0 | 51.5 | 50.2 | 52.5 | 51.8 |
| HEAT BUILDUP, °C. | 49.5 | 52.2 | 50.6 | 49.4 | 48.3 |
| FAILURE TESTING | | | | | |
| CUT GROWTH, KG | 97.2 | 61.8 | 86.0 | 78.8 | 55.2 |
| FATIGUE, CHAR.LIFE, KC | 706 | 636 | 673 | 607 | 692 |
| DYNAMIC PROPERTIES-ROLLING RESISTANCE CONDITIONS | | | | | |
| E', MPa | 7.88 | 6.89 | 6.97 | 8.10 | 7.17 |
| E", MPa | 1.25 | 1.18 | 1.19 | 1.25 | 1.10 |
| PRED. ROL. RES., % | 88.3 | 91.4 | 91.4 | 8.77 | 8.77 |
| TAN DELTA | 0.159 | 0.171 | 0.171 | 0.154 | 0.153 |
| DYNAMIC PROPERTIES-TRACTION CONDITIONS | | | | | |
| E", MPa | 1.29 | 1.23 | 1.18 | 1.32 | 1.26 |
| D", 1/MPa | .0295 | .0325 | .0304 | .0257 | .0295 |
| MODIFIED VEITH TROUSER TEAR PROPERTIES | | | | | |
| TEAR STRENGTH, KN/M | 62.3 | 56.6 | 57.0 | 39.0 | 61.1 |
| KNOTTY TEAR INDEX, KN/M | 18.0 | 18.1 | 17.9 | 10.3 | 22.2 |

*Carbon Black A

Figure 14:
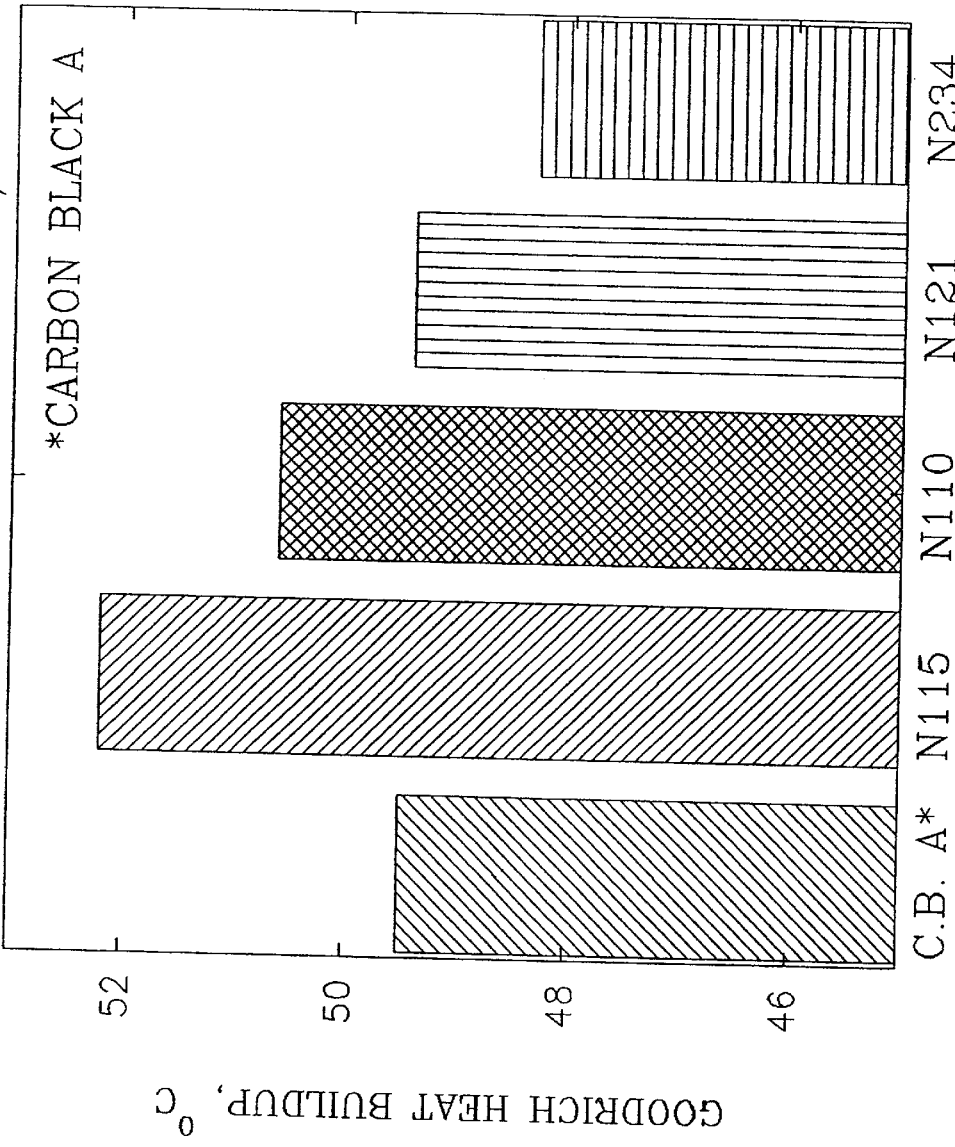
FIG. 14 shows heat buildup properties in NR/BR tread.
Figure 15:
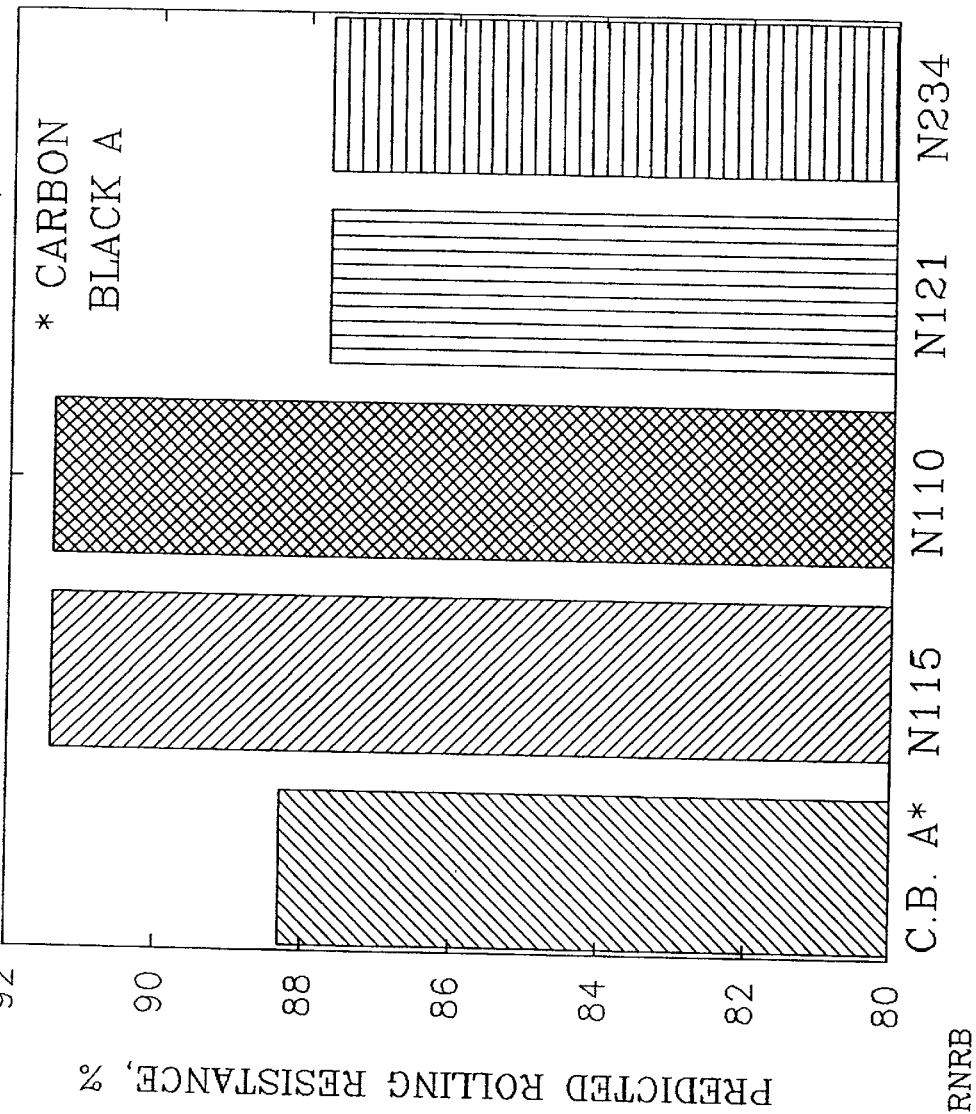
FIG. 15 shows dynamic properties in NR/BR tread.

The elongation levels for these tread blacks range from 519–634%, with carbon black A (593%) being lower than N110 and N115 at 634 and 616%, respectively (Table 8). Rheometer cure rates are similar for these tread blacks in this formulation. The relative hysteresis performances in this tread formulation, as indicated by heat build-up and predicted rolling resistance levels are shown in FIGS. 14 and 15. Carbon black A exhibits heat build-up and predicted rolling resistance levels lower than N110 and N115 and equal to N121. Compared to N234, carbon black A develops a slightly higher heat build-up level but nearly equal predicted rolling resistance levels.

Figure 6:
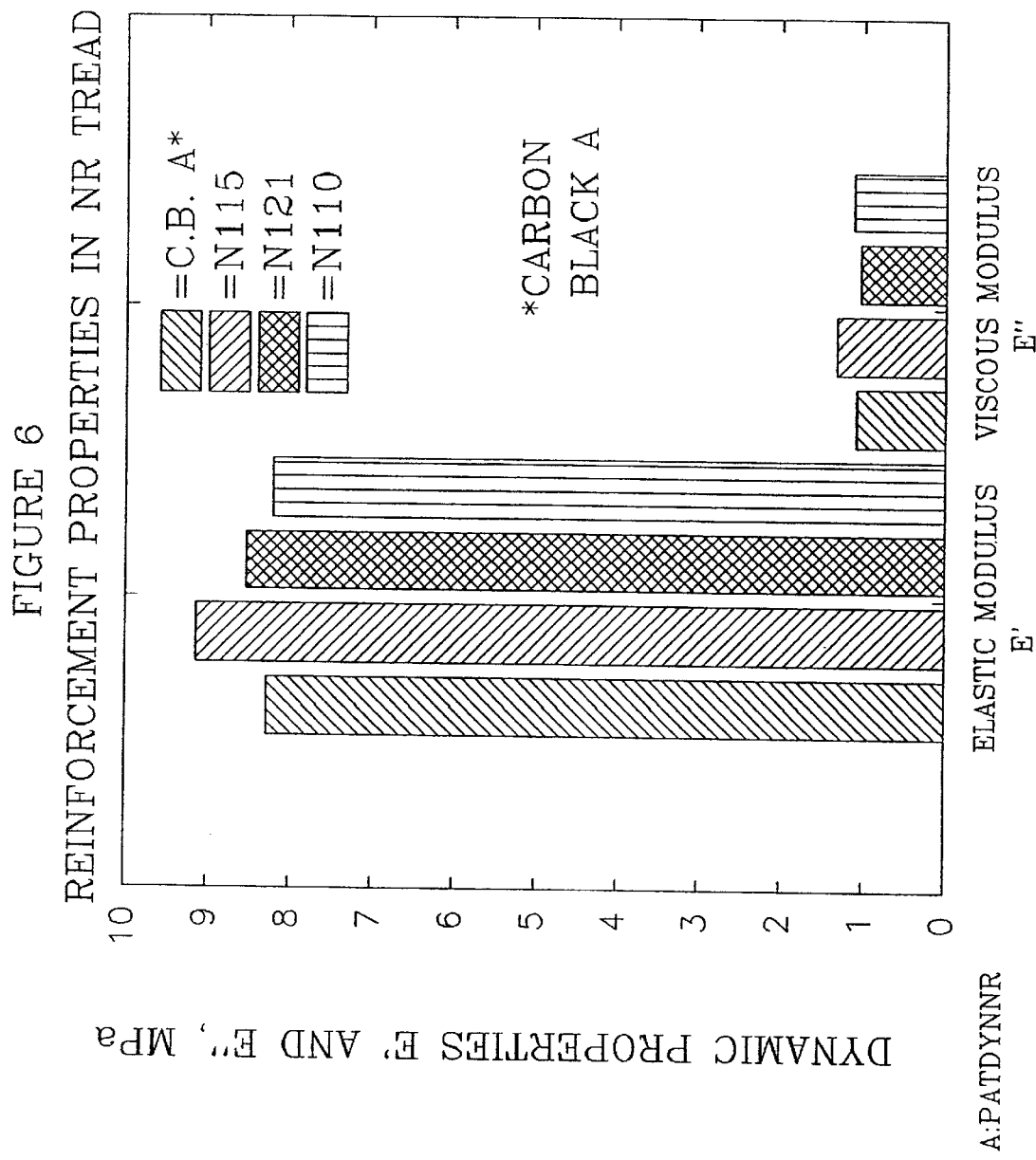
FIG. 6 shows dynamic properties in NR tread.
Figure 7:
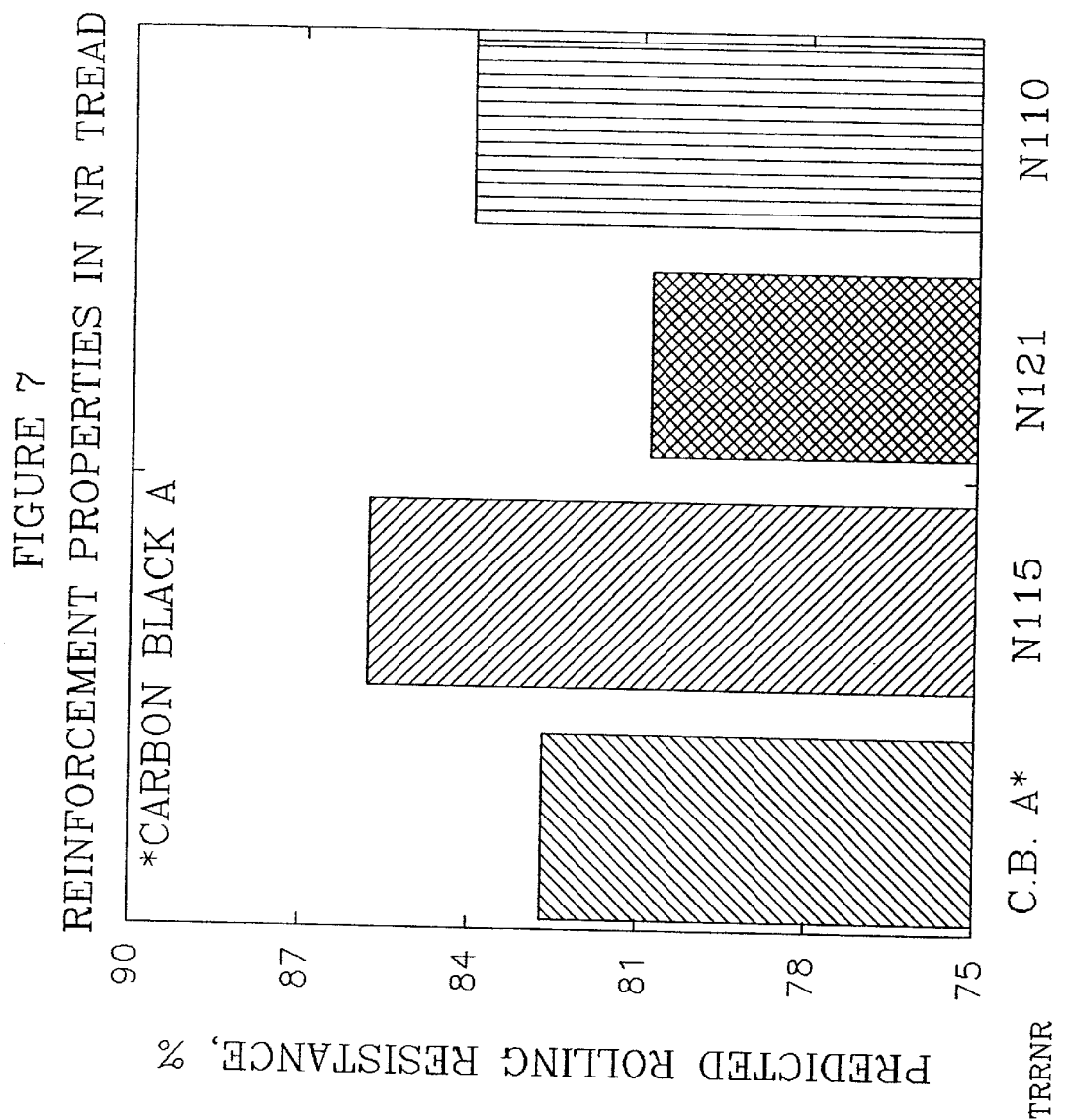
FIG. 7 shows predicted rolling resistance properties in NR tread.
Figure 16:
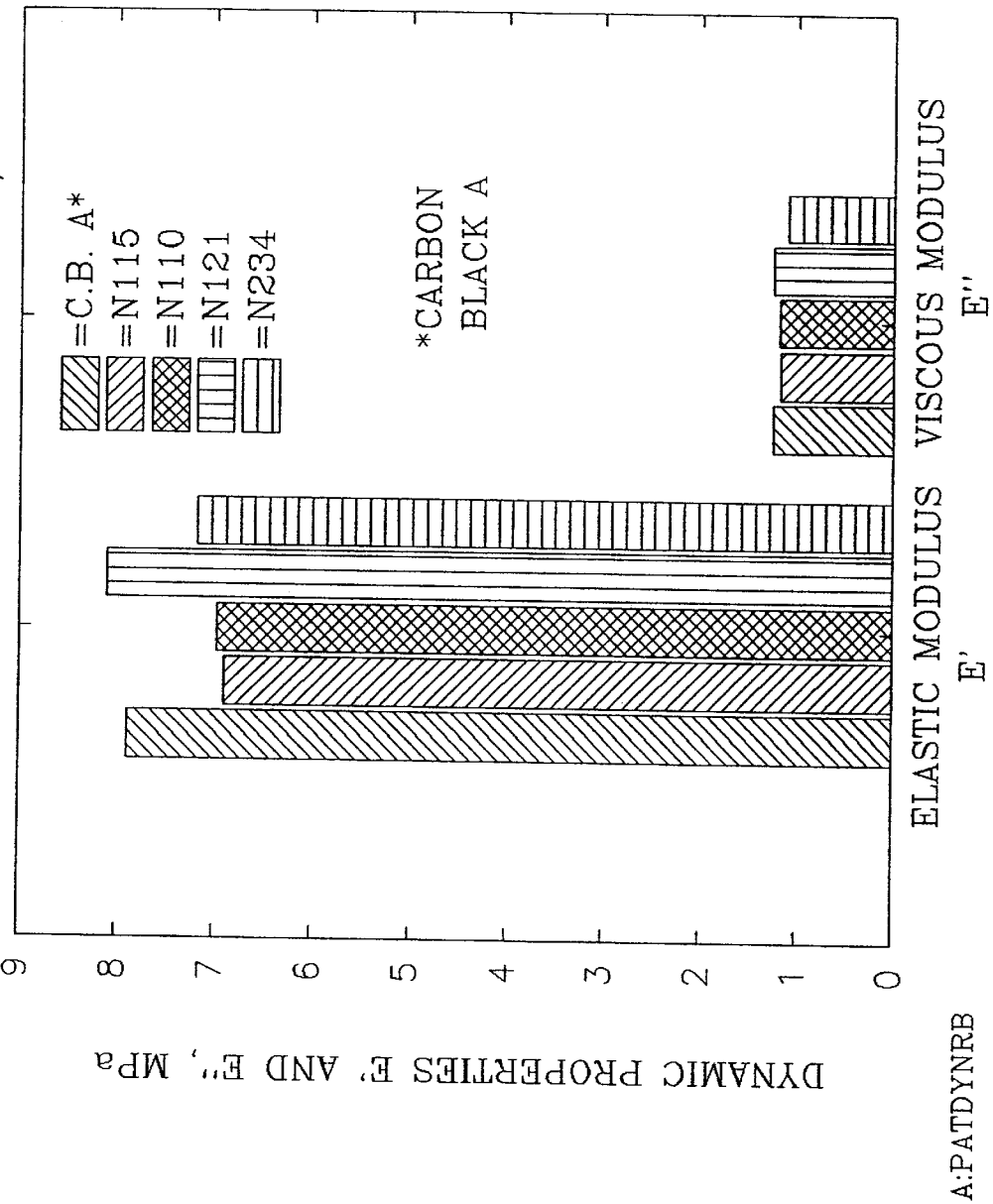
FIG. 16 shows predicted rolling resistance properties in NR/BR tread.

Relative to N110, the elastic modulus level of carbon black A is higher in this formulation than observed in the NR tread compounds in Study 1 and approaches the performance of N121 (FIGS. 6 and 16). N234 performs closer to N110 and N115 in E" level. The viscous modulus property levels of these tread blacks are more similar in the NR/BR formulation than found in the NR formulation, with carbon black A having a slightly higher E" level than N110 and N115. This E" level is comparable to N121 and higher than N234.

Figure 17:
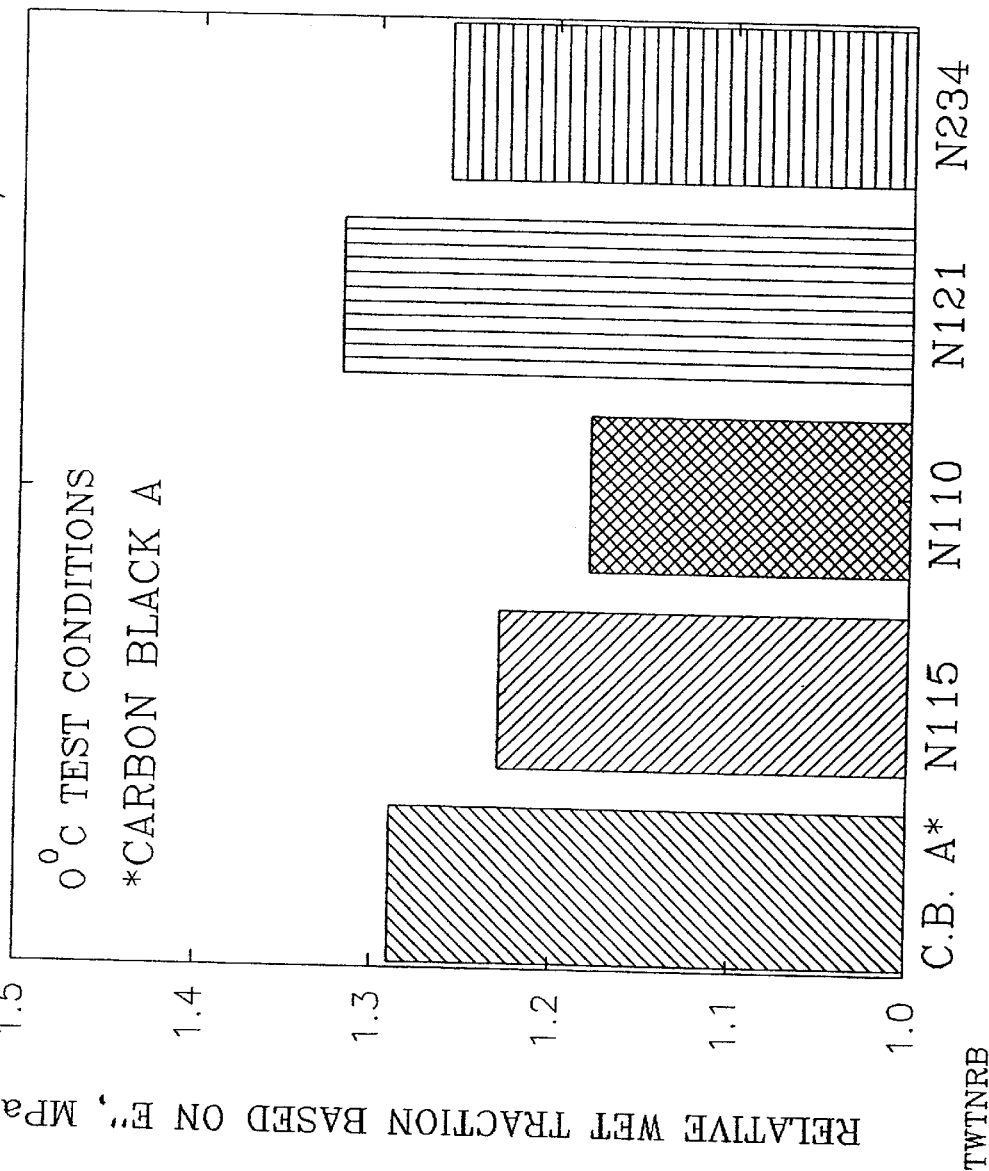
FIG. 17 shows predicted wet traction properties in NR/BR tread.
Figure 18:
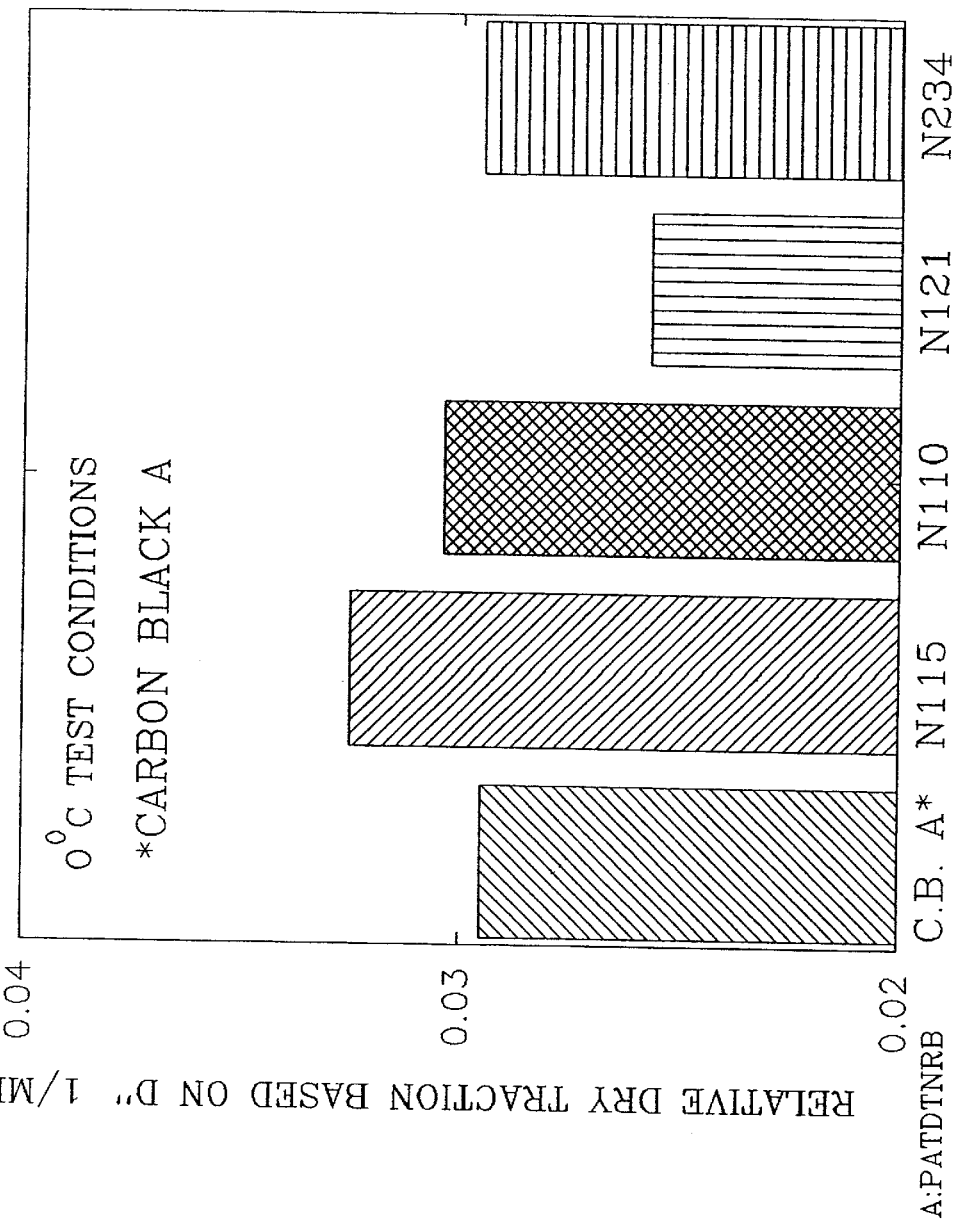
FIG. 18 shows predicted dry traction properties in NR/BR tread.

The predicted relative traction properties for carbon black A are given in FIGS. 17 and 18. The wet traction performance is comparable to N121 and slightly higher than N110, N115 or N234. In terms of dry traction its predicted performance is slightly lower than N110 and N234, lower than N115 and higher than N121.

Figure 19:
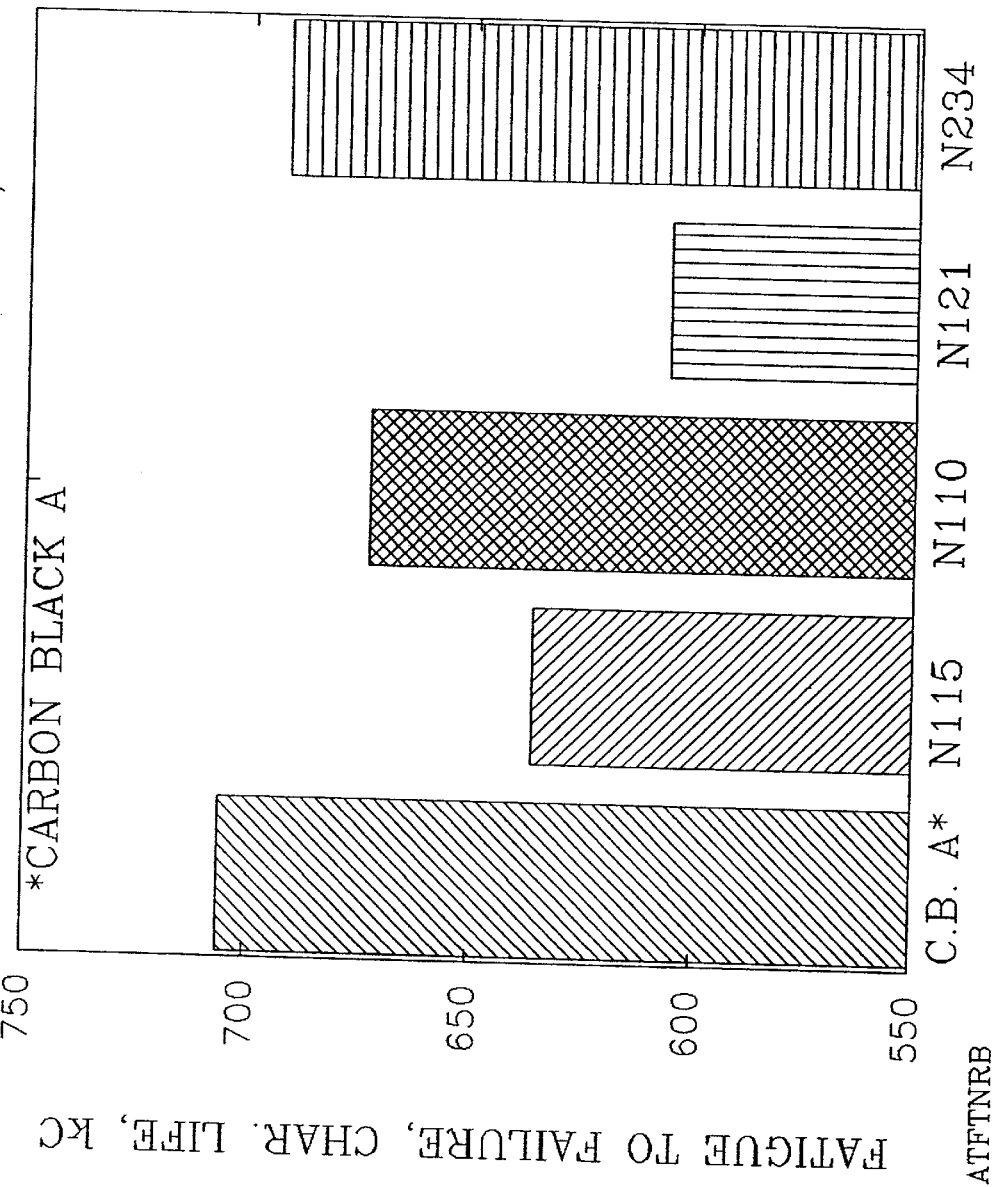
FIG. 19 shows cut growth properties in NR/BR tread.
Figure 20:
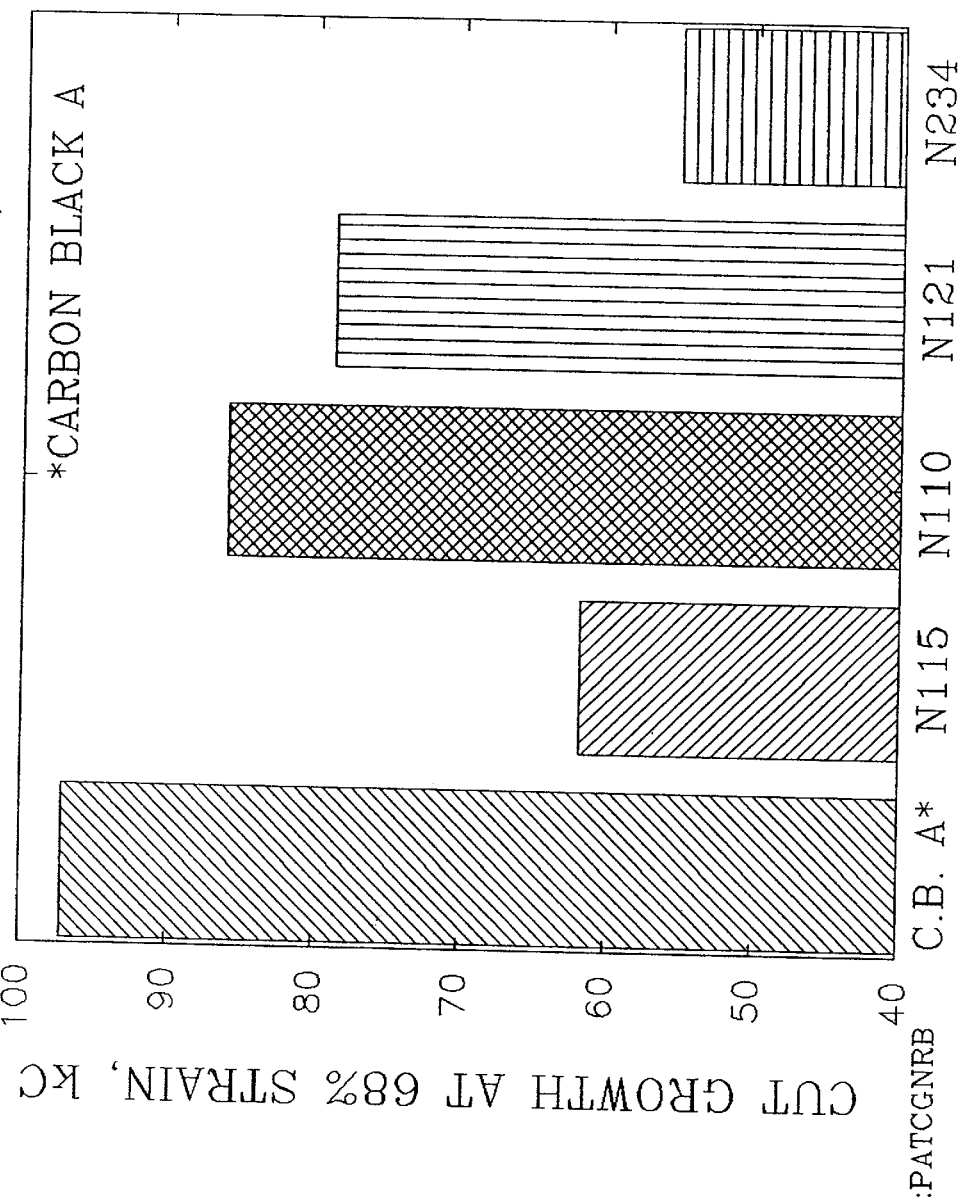
FIG. 20 shows fatigue to failure properties in NR/BR tread.

In Study 2, fatigue and cut-growth measurements were conducted using the Monsanto Fatigue To Failure Tester (FIGS. 19 and 20). The fatigue life data do not correlate with the hysteresis performance of the tread blacks. Carbon black A exhibits a characteristic life comparable to N110 and N234, and better than N115 and N121. FIG. 20 indicates that carbon black A performs better than all of the tread blacks in this study in terms of cut-growth resistances, followed by N110.

Figure 21:
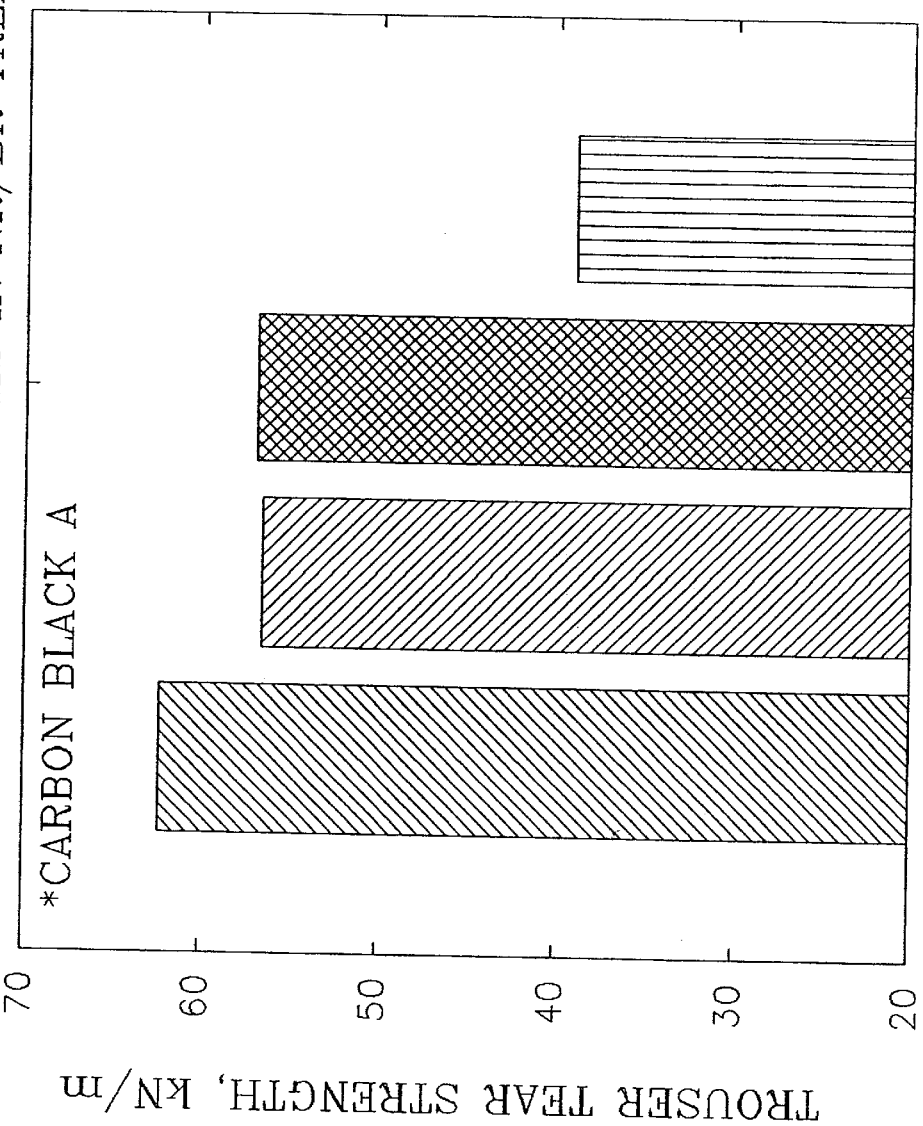
FIG. 21 shows modified Veith trouser (tear strength) properties in NR/BR tread.
Figure 22:
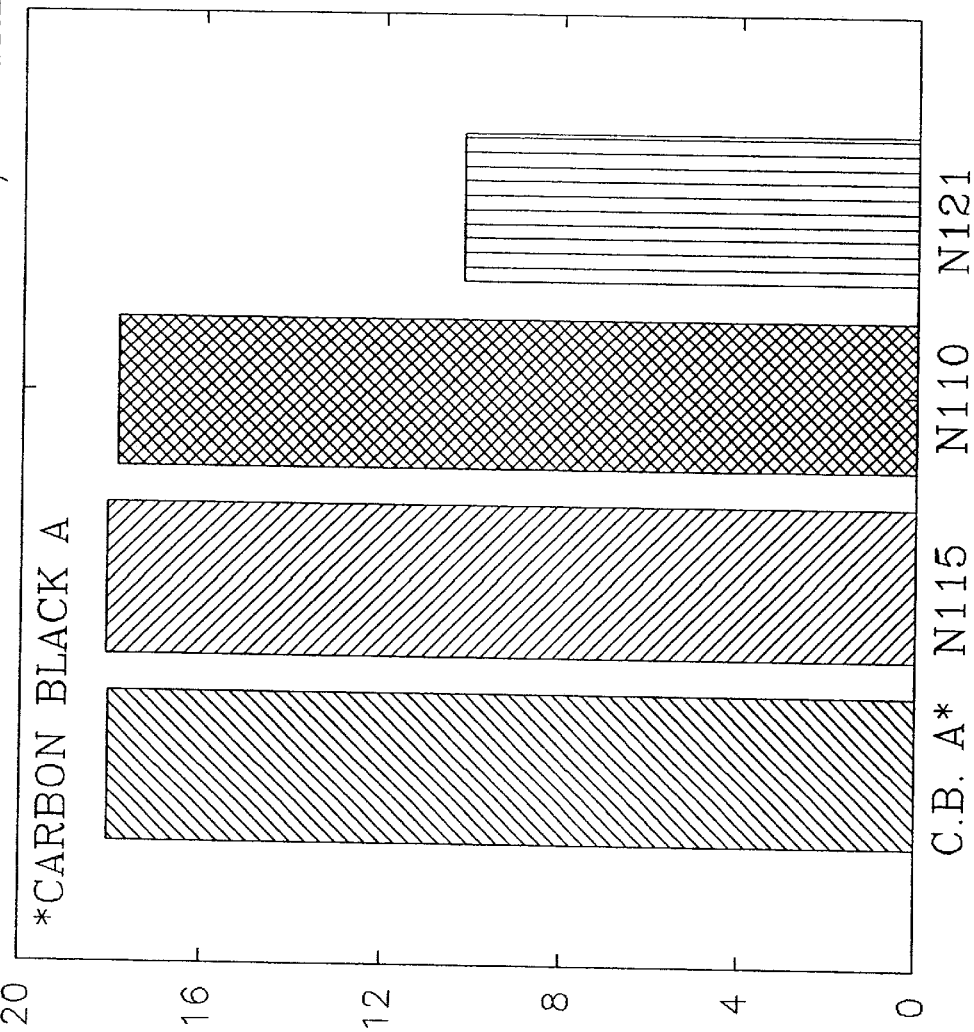
FIG. 22 shows modified Veith trouser (knotty tear) properties in NR/BR tread.

In terms of trouser tear properties, carbon black A develops a slightly higher tear strength level than N110 and N115, and a much higher level than N121 (FIG. 21). A similar trend is observed for knotty tear index (FIG. 22).

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rubber composition suitable for use in the fabrication of tire tread rubber composition comprising:
   a. a carbon black, wherein said carbon black comprises:
      1. a carbon black particle size of between about 16.0 and about 19.0 nm;
      2. said carbon black particle having a dibutylphtalate absorption value of between about 100 to about 115 cc/100 g;
      3. said carbon black particle further comprising aggregates having a weight percent of ellipsoidal aggregates greater than about 14.

2. The rubber composition of claim 1, wherein said carbon black particles have a mean particle size of between about 17.0 nm and about 18.0 nm.

3. The rubber composition of claim 1, wherein the weight percent of ellipsoidal aggregates is about 17.2.

4. The rubber composition of claim 1, wherein said aggregates comprise:

a. a mean diameter of about 71.3 nm;

b. a weight mean diameter of about 139 nm;

c. a heterogeneity index of about 1.95; and d. an intra-aggregate absorption of about 1.85.

5. The rubber composition of claim 4, wherein said aggregates further comprise a weight percent of about 17.2.

6. The rubber composition of claim 1, wherein the rubber comprises natural rubber.

7. The rubber composition of claim 1, wherein the rubber comprises a blend of natural rubber and synthetic polymers.

8. The rubber composition of claim 7, wherein the synthetic polymer is selected from the group consisting of styrene-butadiene rubber and butadiene rubber.

9. The rubber composition of claim 7, wherein the natural and synthetic rubbers are oil extended.

10. The rubber composition of claim 7, wherein the rubbers are vulcanizable rubbers.

11. The rubber composition of claim 7, wherein the rubber further comprises a diene elastomer.

12. The rubber composition of claim 11, wherein the elastomer is mixed with at least one other second diene elastomer selected from the group consisting of carboxyl rubbers, epoxy rubbers, transpolypentenamer, halogenated butyl rubbers, 2-chlorobutadiene rubbers, terpolymers of ethylene, propylene, unconjugated dienes, copolymers of ethylene and propylene, copolymers of ethyl acetate and vinyl acetate, aromatic vinyl compounds, polyisoprene, natural rubbers, conjugated dienes and polybutadiene rubbers.

13. The rubber composition of claim 11, wherein the diene elastomer is selected from the group consisting of carboxyl rubbers, epoxy rubbers, transpolypentenamer, halogenated butyl rubbers, 2-chlorobutadiene rubbers, terpolymers of ethylene, propylene, unconjugated dienes, copolymers of ethylene and propylene, copolymers of ethyl acetate and vinyl acetate, aromatic vinyl compounds, polyisoprene, conjugated dienes, natural rubbers, and polybutadiene rubbers.

14. The rubber composition of claim 12, wherein said second diene elastomer comprises up to 70 parts by weight with respect to said first diene elastomer present.

15. The rubber composition of claim 14, wherein said second diene elastomer is polyisoprene further comprising >90 percent cis-1,4 bonds.

16. The rubber composition of claim 13, wherein the conjugated dienes are selected from the group consisting of butadiene-1,3, isoprene, and 2,3-dimethyl-1,3-butadiene.

17. The rubber composition of claim 13, wherein the aromatic vinyls are selected from the group consisting of styrene, ortho-methylstyrene, meta-methylstyrene, para-methylstyrene, or vinyl-toluene.

18. The rubber composition of claim 13, wherein the copolymer of conjugated diene and aromatic vinyl compound further comprise a total content of styrene of between 5 and 50 percent by weight, and a glass transition temperature of between 0 degrees and negative 80 degrees Celsius when measured by differential thermal analysis.

* * * * *

UNITED STATES PATENT AND TRADEMARK OFFICE
CERTIFICATE OF CORRECTION

PATENT NO.    : 6,608,132 B1
DATED         : August 19, 2003
INVENTOR(S)   : Francis G. Bomo, Ronald A. Swor and James M. Watson It is certified that error appears in the above-identified patent and that said Letters Patent is hereby corrected as shown below:

<u>Title page,</u>
Item [75], should read as follows:

-- [75] Inventors:  Francis G. Bomo, Flossmore, IL (US);
                            Ronald A. Swor, Monroe, LA (US); and
                            James A. Watson, Monroe, LA (US). --

Signed and Sealed this

Twentieth Day of January, 2004

JON W. DUDAS
*Acting Director of the United States Patent and Trademark Office*